US012031883B2

(12) United States Patent
Breton

(10) Patent No.: US 12,031,883 B2
(45) Date of Patent: Jul. 9, 2024

(54) APPARATUS AND METHOD FOR TESTING AUTOMATED VEHICLES

(71) Applicant: Horiba Instruments Incorporated, Irvine, CA (US)

(72) Inventor: Leo Alphonse Gerard Breton, Washington, DC (US)

(73) Assignee: HORIBA Instruments Incorporated, Irvine, CA (US)

( * ) Notice: Subject to any disclaimer, the term of this patent is extended or adjusted under 35 U.S.C. 154(b) by 350 days.

(21) Appl. No.: 17/589,372

(22) Filed: Jan. 31, 2022

(65) Prior Publication Data
US 2022/0244142 A1  Aug. 4, 2022

Related U.S. Application Data

(60) Provisional application No. 63/143,653, filed on Jan. 29, 2021.

(51) Int. Cl.
*G01M 17/007* (2006.01)
*H04N 23/90* (2023.01)
*B60W 60/00* (2020.01)

(52) U.S. Cl.
CPC ........ *G01M 17/0072* (2013.01); *H04N 23/90* (2023.01); *B60W 60/001* (2020.02); *B60W 2420/403* (2013.01)

(58) Field of Classification Search
CPC ............. G01M 17/00; G01M 17/0072; G01M 17/0074; G01M 17/065; B60W 40/105;
(Continued)

(56) References Cited

U.S. PATENT DOCUMENTS 6,457,351 B1   10/2002  Yamamoto
7,693,641 B2   4/2010   Maruki
(Continued)

FOREIGN PATENT DOCUMENTS

DE   102004057947 A1   6/2006
DE   102016012772 A1   4/2018
(Continued)

OTHER PUBLICATIONS

International Search Report for International Application No. PCT/US2022/014569 dated May 12, 2022, 2 pgs.
(Continued)

*Primary Examiner* — Benjamin R Schmitt
(74) *Attorney, Agent, or Firm* — Brooks Kushman P.C.

(57) ABSTRACT

A testing method, for a camera-based autonomous or semi-autonomous vehicle control system, includes while the vehicle control system operates with at least one control input from at least one camera during a first laboratory test of the vehicle control system, automatically controlling an electronic simulator configured to generate signals indicative of dynamic virtual lane markers based on speed information from a speed schedule or a feedback signal from a laboratory instrument, and displaying the virtual lane markers on a transparent or semi-transparent screen or monitor, within view of the at least one camera, and at screen or monitor coordinates reflective of relative locations of the at least one camera and the screen or monitor.

9 Claims, 8 Drawing Sheets

(58) Field of Classification Search
CPC ......... B60W 50/0002; B60W 50/0012; B60W 60/001; B60W 2420/403; G05B 17/00; G05B 23/00; G05B 24/00
See application file for complete search history.

(56) References Cited

U.S. PATENT DOCUMENTS

| | | |
|---|---|---|
| 10,332,292 B1 | 6/2019 | Arnicar |
| 2007/0088472 A1 | 4/2007 | Ganzhorn et al. |
| 2010/0170330 A1 | 7/2010 | Scheepers et al. |
| 2014/0014473 A1 | 1/2014 | Zecha et al. |
| 2014/0220513 A1 | 8/2014 | Harkness |
| 2015/0149031 A1 | 5/2015 | Pfister |
| 2017/0132118 A1 | 5/2017 | Stefan et al. |
| 2017/0248960 A1 | 8/2017 | Shashua et al. |
| 2018/0033217 A1 | 2/2018 | Komada |
| 2018/0040176 A1 | 2/2018 | Ogawa et al. |
| 2018/0058879 A1* | 3/2018 | Tayama ............... B60W 30/16 |
| 2018/0148072 A1* | 5/2018 | Kamiya ............... B60W 50/14 |
| 2019/0005052 A1 | 1/2019 | Ura |
| 2019/0129831 A1 | 5/2019 | Goldberg |
| 2019/0195734 A1 | 6/2019 | Breton |
| 2021/0010902 A1 | 1/2021 | Breton |

FOREIGN PATENT DOCUMENTS

| | | |
|---|---|---|
| DE | 102017200180 A1 | 7/2018 |
| DE | 102017107396 A1 | 10/2018 |
| GB | 2557252 A | 6/2018 |
| JP | 2018155753 A | 10/2018 |
| KR | 20120139559 A | 12/2012 |
| WO | 2019083513 A1 | 5/2019 |
| WO | 2019133686 A1 | 7/2019 |

OTHER PUBLICATIONS

International Preliminary Report on Patentability for International Application No. PCT/US2022/014569, dated Jul. 31, 2023.

* cited by examiner

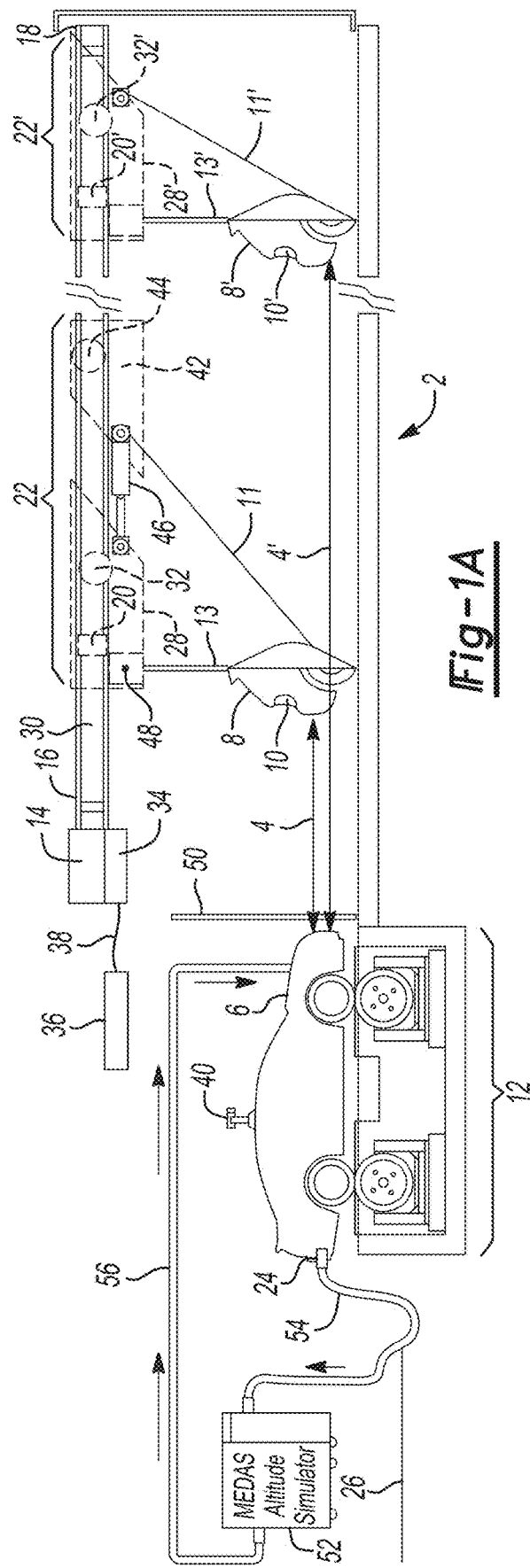
_Fig-1A_
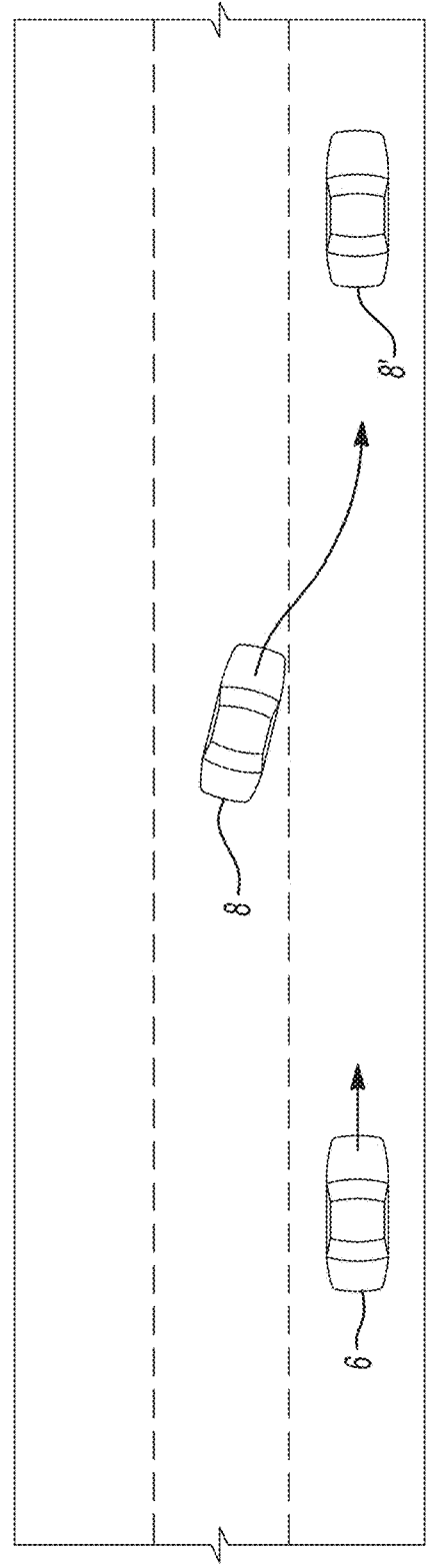
_Fig-1B_

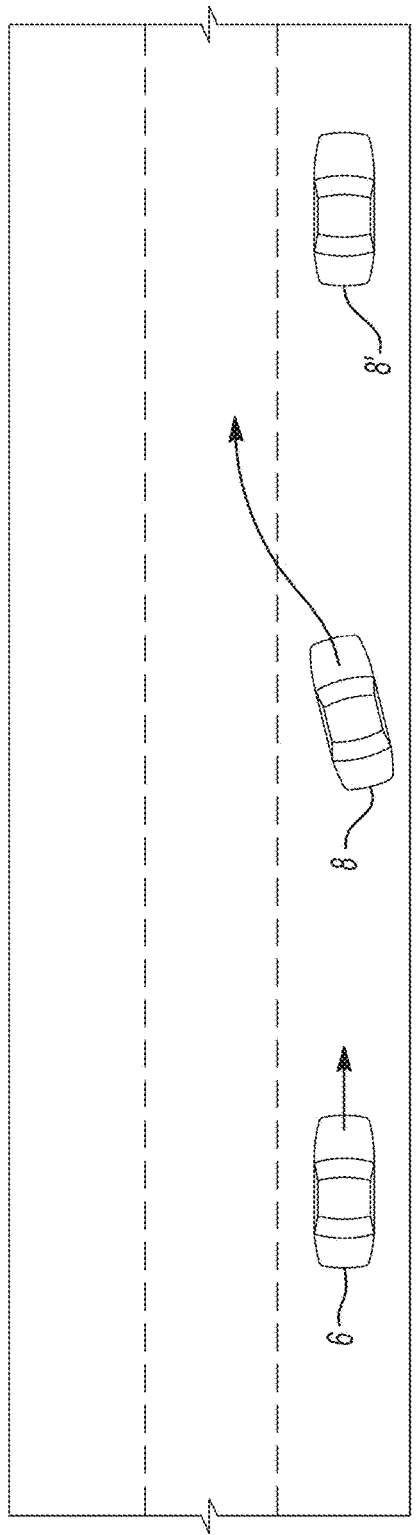
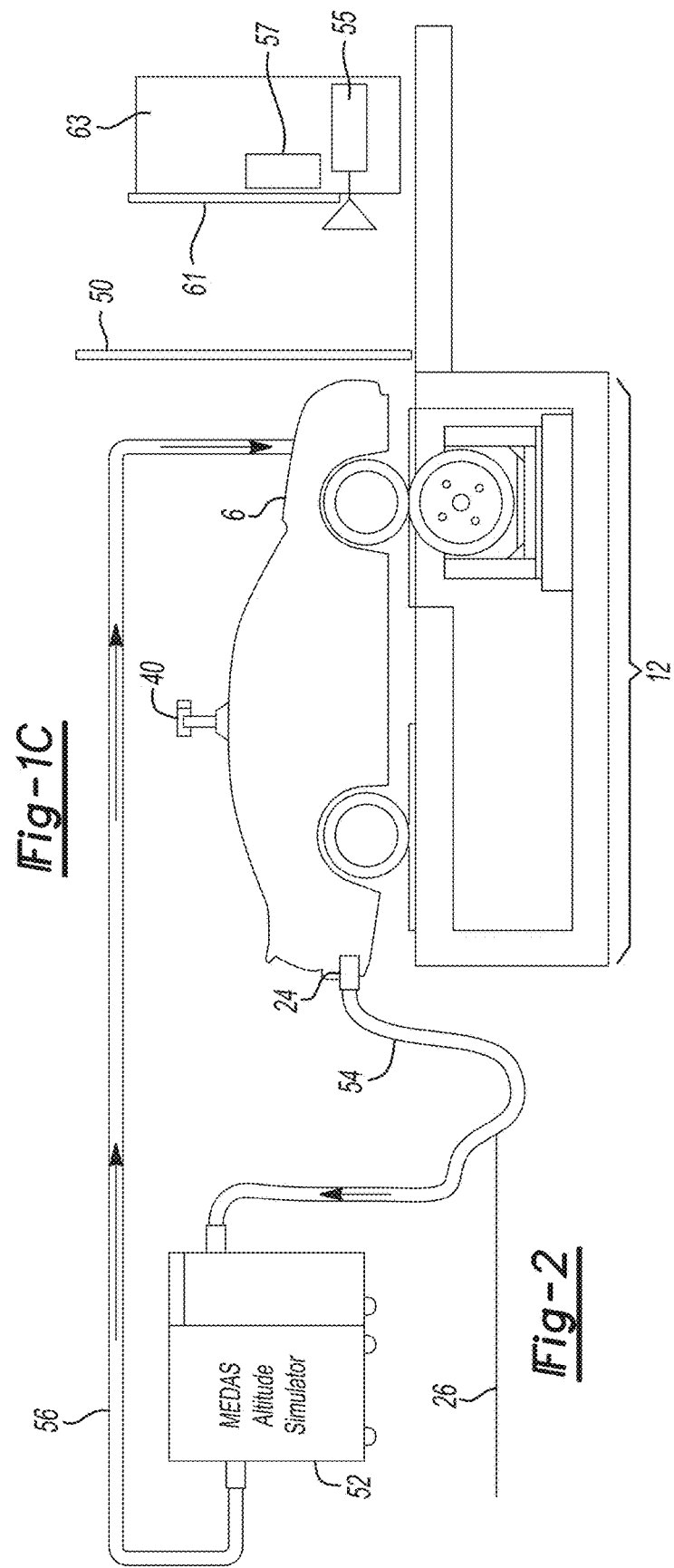

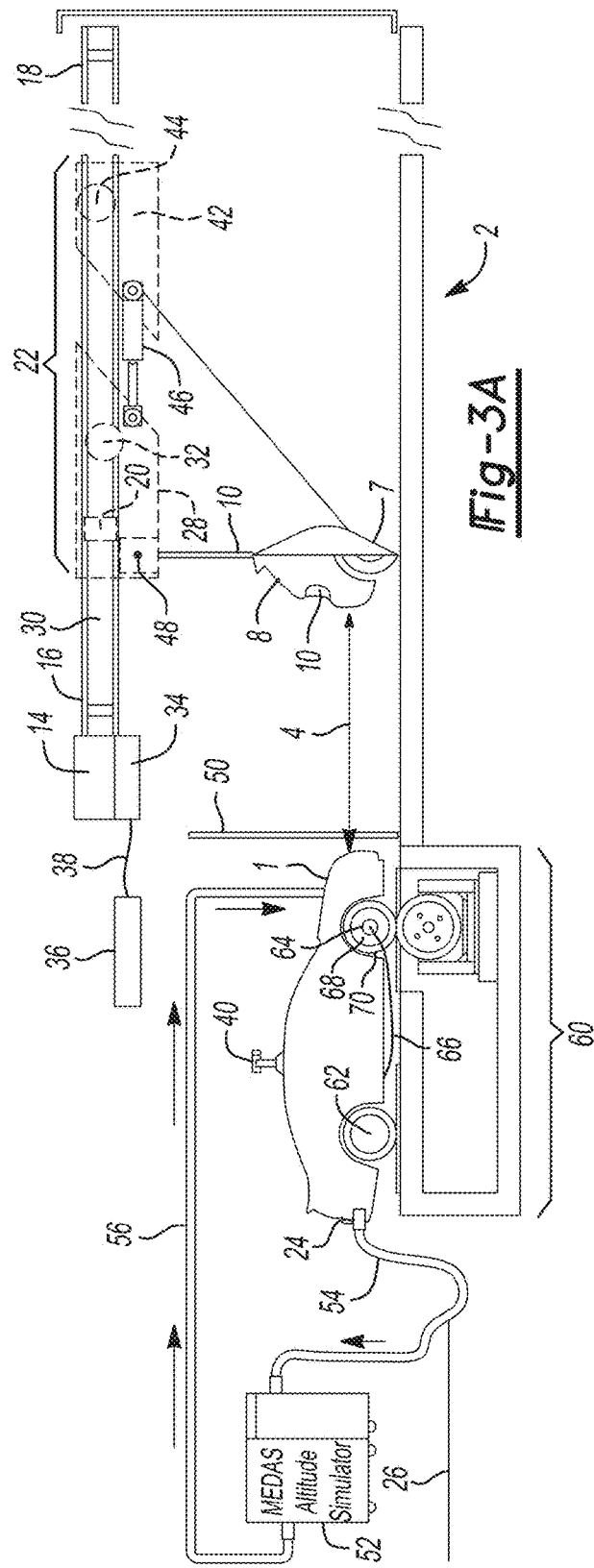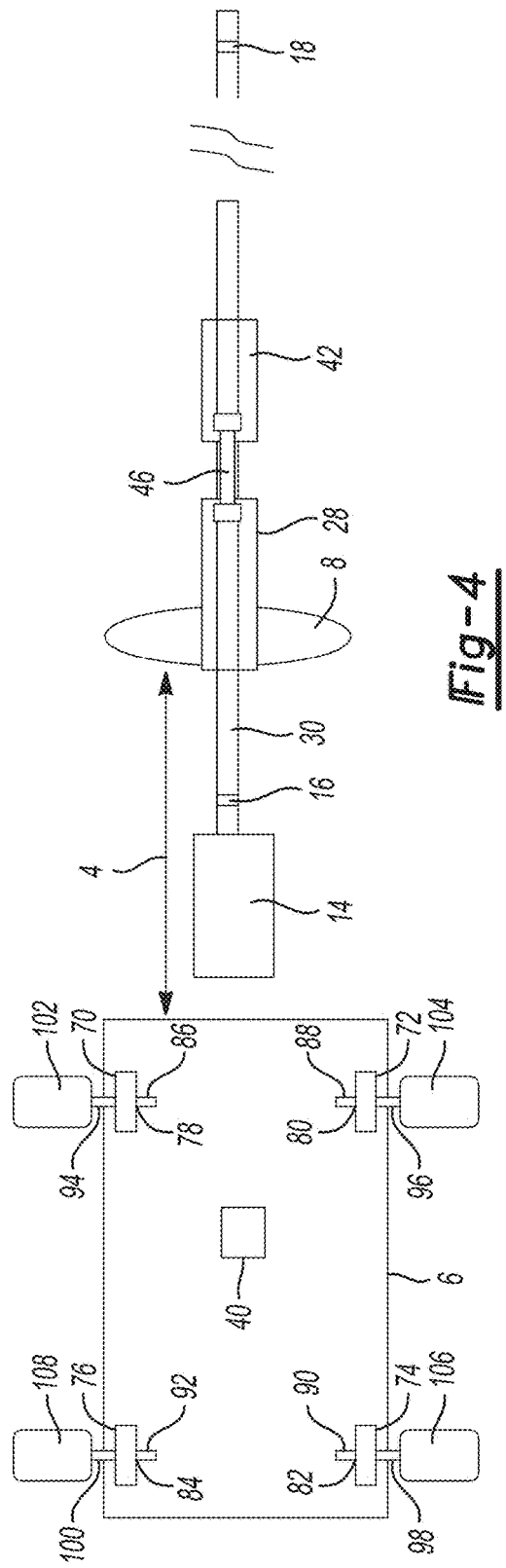

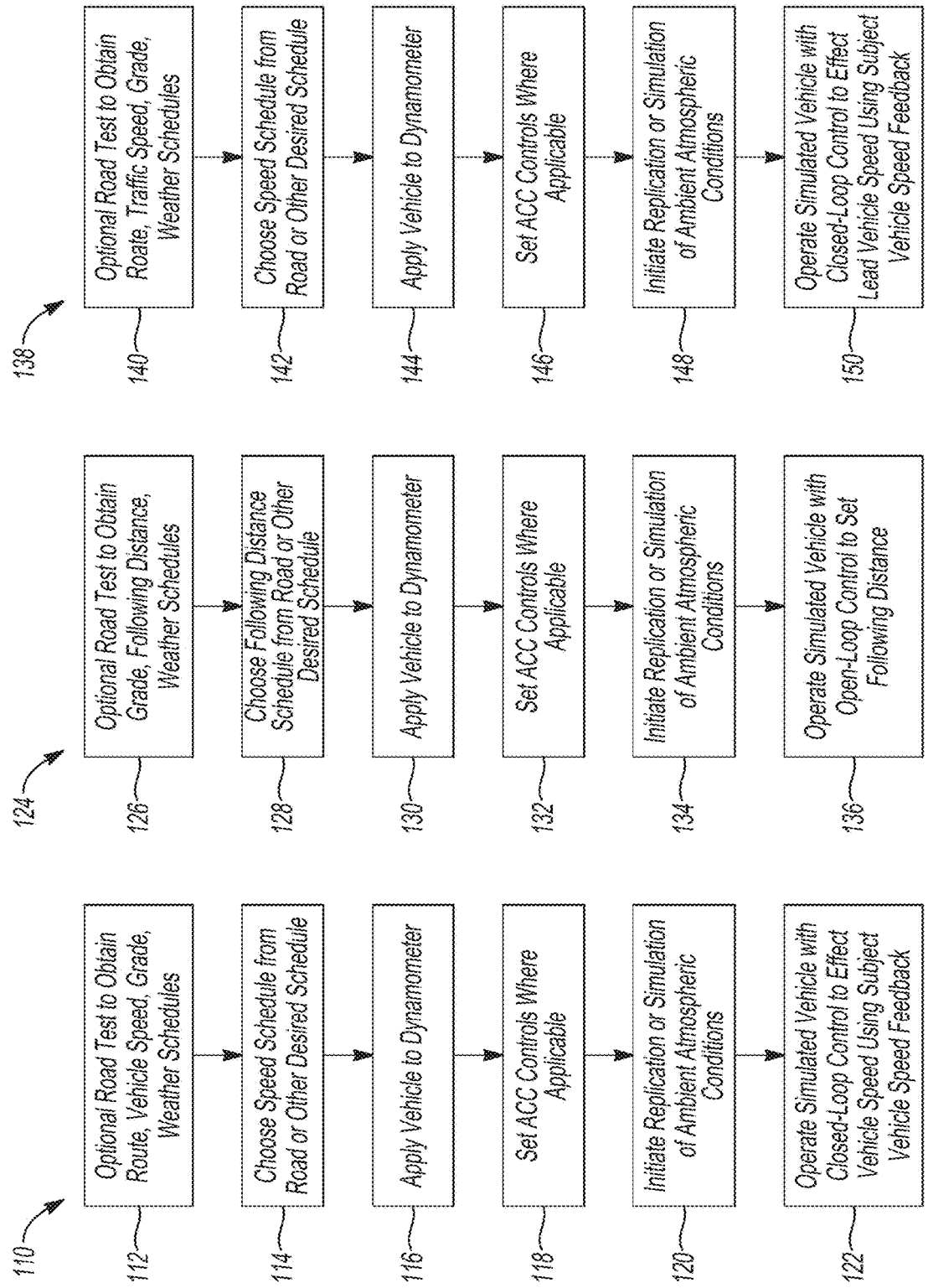

APPARATUS AND METHOD FOR TESTING AUTOMATED VEHICLES

CROSS-REFERENCE TO RELATED APPLICATION

This application claims the benefit of U.S. Provisional Application No. 63/143,653, filed Jan. 29, 2021, the entire contents of which are hereby incorporated by reference herein.

TECHNICAL FIELD

The present disclosure relates to automotive exhaust gas emissions measurement and analysis, the measurement of the energy efficiency of automobiles, and the control of automobiles with autonomous features. More specifically, it relates to predicting the real-world exhaust gas emissions from automobiles with Internal Combustion Engines (ICEs), including Hybrid Electric Vehicles (HEVs), and the real-world energy efficiency and automatic braking responses of any automobile type with autonomous braking features, including Battery Electric Vehicles (BEVs), based on laboratory testing.

BACKGROUND

Modern automobiles with ICEs can operate reliably under almost any combination of environmental, road grade, and driving conditions found on Earth. Such vehicles are common throughout the world and operate regularly and reliably in ambient temperatures ranging from well below 0 C to more than 40 C, from dry desert conditions to humid rainforests, and in bumper-to-bumper, slow city traffic to high speed operation on the German Autobahn.

Many countries that host large numbers of automobiles have exhaust gas emissions standards, i.e. "tailpipe" standards that auto manufacturers must comply with. But experience has shown that it is difficult and expensive to test vehicles under the broad range of real-world environmental, road, and driving conditions that are known to affect emissions and fuel economy of vehicles in the real world. And it is well known that the energy efficiency of HEVs and the range of BEVs on a single charge decrease at lower ambient temperatures.

Laboratory-based tailpipe emissions testing has been historically performed under a limited range of ambient conditions, vehicle speed patterns, and driving conditions. Because the number of vehicles has increased dramatically in recent years worldwide, and because vehicles have become increasingly computer-controlled, it has become necessary for governments and automobile manufacturers to better understand the emissions of vehicles across a wider range of operating conditions so that National Ambient Air Quality (NAAQ) standards can continue to be met in current ambient air "attainment areas" and can eventually be met in current "non-attainment areas." It has also become necessary for vehicle manufacturers to be able to assess the effects of potential changes to vehicle emission controls and powertrain calibrations across a wider range of ambient and operating conditions.

New vehicle exhaust gas emissions regulations are driven, in part, by measured levels of NAAQ for specific criteria pollutants that are known to directly or indirectly affect human health and for the control of greenhouse gas emissions. NAAQ levels vary widely throughout the world, depending on both mobile emissions sources and stationary sources of pollution. Population densities, weather conditions, vehicle emissions performance, the age and makeup of the local in-use vehicle fleet, stationary sources of air pollution, and geographic features are all factors affecting NAAQ. For example, the air quality in Southern California can be particularly poor because of a high population density, combined with a well-known atmospheric temperature inversion due to geographic features and atmospheric conditions.

Automobiles and trucks with ICEs contribute to the overall pollution from "mobile sources," most notably from "tailpipe emissions." And BEVs contribute to "stationary sources" of pollution, i.e. emissions from electrical power plants. The tailpipe emissions and energy efficiency of any particular vehicle operating in the real world is dependent on many factors, including various environmental conditions, road grade, driver behavior, traffic conditions, and the effectiveness of the vehicle's emissions controls related to those factors.

BEVs may become a significant factor of overall pollution from "stationary sources" in the future if they are produced in increasingly larger numbers because they get their energy from the power grid. Therefore, it is important to understand the energy efficiency of BEVs in real-world driving as well.

The promulgation of new emissions standards for controlling criteria pollutant and greenhouse gas emissions from vehicles with ICEs has been traditionally linked to a laboratory-based testing regime and related methodologies because laboratory-based testing can be very repeatable and because mass-based, real-world (i.e. on-road) testing had not been possible until recently, i.e. since the commercialization of Portable Emissions Measurement Systems (PEMS).

While laboratory testing methods are known to be very accurate and repeatable for emissions measurements under actual test conditions, real-world driving can subject a vehicle to a wide range of conditions that traditional laboratory testing protocols would not. There are many reasons for this, including the difficulty of simulating the full range of real-world temperature and atmospheric pressure conditions in the laboratory, the effects of real-world driver behavior under actual traffic conditions, etc.

To further compound the historical problems associated with employing laboratory testing methods vs. real-world vehicle operation, the availability and popularity of vehicles with autonomous features is growing rapidly. Vehicles with autonomous or automated longitudinal speed and acceleration control are now commonly available on the market and may soon represent the majority. These vehicles are able to maintain a setpoint vehicle speed when there are no leading vehicles, i.e. no vehicles in front of the subject vehicle, and in close proximity and are able to vary their speeds when approaching a slower vehicle from behind or when a vehicle changes lanes and enters the path of the subject vehicle, to maintain safe vehicle separation.

It is not currently possible to "blind test" these vehicles in a laboratory environment for measuring exhaust emissions or fuel economy while they interact autonomously with other vehicles (blind testing requires that no changes to the subject vehicle are allowed and no knowledge of the technical details of the vehicle control system are required). But it is likely that autonomous features affect emissions and energy efficiencies in most vehicles, especially if the vehicle powertrains employ different calibrations compared with the calibrations that would be employed for a similar real-world drive under conventional driver control.

With the depth of technical knowledge possessed by the developers of the vehicles and autonomous systems, it may be possible to isolate and simulate the effects that other, conflicting vehicles in real-world traffic have on the automated vehicle control systems to obtain some degree of confidence regarding the operation of the system in the real world, but that type of testing does not demonstrate the complete vehicle system behaves the same way in the real world. A complete vehicle system test would offer the highest level of confidence that laboratory results accurately and adequately reflect real-world performance and would be appropriate and suitable for regulators who do not have regular access to detailed technical information regarding a specific make and model of vehicle. And while it is possible that emissions and fuel economy characteristics of a vehicle may be degraded with the employment of automated longitudinal control, it is also possible for fuel economy and emissions performance to be improved by employing automated longitudinal control. To accomplish these goals however, a well-controlled, laboratory-based testing apparatus and associated methods are needed to maximize testing precision for both automobile manufacturers and regulators.

Traditional laboratory testing for emissions and energy efficiency compliance purposes usually includes measuring exhaust emissions or energy efficiency of the subject vehicle operating on one or more vehicle speed schedules on a dynamometer or rolls. Various vehicle speed schedules are intended to represent various types of real-world vehicle operations. For example, the Environmental Protection Agency (EPA) employs different speed schedules for representing city operation, highway operation, and more aggressive vehicle operation. In each case, the vehicle is operated as close as possible to the corresponding speed schedule by a driver. But newer vehicle models are employing autonomous, dynamic, longitudinal speed control as a convenience feature in ever-increasing numbers. Because these features are truly convenient by automatically maintaining safe vehicle separation under any condition of operation, ranging from bumper-to-bumper city traffic, to highway operation, and because the cost of the technology is falling rapidly, autonomous speed control features are likely to be found, and used, on most vehicles in the future. And they are likely to continue to be one of the key technologies of fully-autonomous vehicles of the future.

As the availability and usage of autonomous vehicle speed control continues to grow, however, it is not yet known how to test such vehicles in a laboratory environment, especially within a traditional testing regime based on operation of the subject vehicle on specific vehicle speed schedules using a dynamometer or rolls. It is unknown how the use of standard vehicle speed schedules will be interpreted in a future where vehicles are controlling their own speeds much of the time. For example, the speed schedules may simply be interpreted as the speeds the subject vehicle is forced to follow in response to speeds of leading vehicles traveling at the "speed of traffic" in each case, or may be interpreted as "the speed of traffic" itself (traffic in which the subject vehicle is embedded and must follow).

SUMMARY

Here, certain embodiments may relate to conducting laboratory testing of autonomous vehicles or vehicles with autonomous longitudinal speed or acceleration control to obtain accurate and repeatable exhaust gas mass emissions measurements in the case of ICE vehicles and energy efficiency measurements and automatic braking actions of any vehicle type—measurements and actions that are representative of the real-world energy efficiency and tailpipe emissions, where applicable, for any longitudinally-controlled vehicle model, on any route, and over any set of ambient conditions of interest. These embodiments provide apparatuses and methods to allow the emissions and energy efficiency impacts, and the automatic or emergency braking actions of autonomous longitudinal control vehicle functions to be accurately determined. Furthermore, by simulating or replicating real-world traffic events in a controlled environment, emissions, energy efficiency, and safety system performance can be calibrated, evaluated, and improved.

More specifically, certain embodiments relate to an apparatus for simulating other vehicle traffic by the presence of simulated vehicles that "lead" a test vehicle at varying distances, speeds, and acceleration rates. This allows for simulating another vehicle's entry into (i.e. a "cut-in" maneuver), or exit from (i.e. a "cut-out" maneuver), the test vehicle's travel path, while a vehicle is operating under realistic, simulated vehicle loading conditions in coordination with a dynamometer or rolls assembly, while ambient air conditions are replicated or simulated, and while emissions are sampled using normal emissions measurement systems and methods.

The apparatuses for simulating other vehicles are capable of open-loop position control as well as closed-loop feedback control based on a speed parameter from a subject test vehicle or the associated dynamometer or rolls assembly. The open-loop control mode enables the simulation of vehicles leading the test vehicle according to a predetermined following distance schedule, while the closed-loop operation enables the simulation of vehicles following a desired speed schedule, or causing the subject vehicle itself to follow a desired speed schedule. Both modes of operation also support the simulation of traffic scenarios for testing automated or autonomous braking systems.

One apparatus physically simulates a movable vehicle target body detectable by all types of electronic sensors used in vehicle longitudinal speed control systems, including optical monocular and binocular cameras, laser-based range sensing systems, e.g. LiDAR systems, RADAR-based range sensing systems, as well as networks of sensors comprised of sensors of different types and linked via "sensor fusion." This first apparatus is relevant to the testing of any longitudinal control system.

A second apparatus electronically simulates a virtual target vehicle detectable by one or more types, or by a combination of two or more types of electronic sensors used in vehicle longitudinal speed control systems, including optical monocular and binocular cameras, laser-based range sensing systems, e.g. LiDAR systems, RADAR-based range sensing systems, as well as networks of sensors comprised of sensors of different types and linked via "sensor fusion." This second apparatus is relevant to either testing any longitudinal control sub-system comprising a single sensor technology, or any combination of sensor technologies.

A test method is disclosed in which a simulated vehicle represents prevailing, variable traffic conditions that cause an obstructed test vehicle to follow a desired speed schedule, e.g. a regulatory speed cycle.

Another method is disclosed in which a simulated vehicle represents prevailing traffic conditions defined by a desired absolute or real-world speed schedule, e.g. a regulatory speed cycle, thereby causing a subject vehicle to respond and control itself as though it was engaging with traffic flowing at the speed of the speed schedule.

In another method, the following distance, i.e. the distance between the simulated vehicle and the subject vehicle, is defined by a predetermined schedule of interest. The schedule may be based on a prior real-world test in which following distance was measured and recorded, or may be based on any other schedule of interest.

In yet another method, automated or emergency braking response scenarios are created using a predetermined following distance schedule. And other methods for testing the automated or emergency braking responses of subject vehicles to leading vehicle "cut-in" and "cut-out" maneuvers or scenarios are used in association with a dual target body simulator apparatus.

While testing according to any of the methods described above, exhaust emissions, energy efficiency, fuel economy, and automated braking responses, depending on vehicle type, may be measured.

For example, an autonomous vehicle test method may include operating a simulated vehicle apparatus to cause a subject vehicle, coordinated with a dynamometer or rolls assembly configured to provide road load to the vehicle, to cause the vehicle's speed to follow a desired or real-world vehicle speed schedule or, alternatively, causing a subject vehicle to control its speed according to its embedded algorithms and calibrations, by engaging with simulated traffic "flowing" at the speed of a desired or real-world vehicle speed schedule. Corresponding real-world emissions data, energy efficiency data, or data corresponding to the performance of safety systems, e.g. automated emergency braking, may be captured and used to improve the performance of the associated vehicle systems and for determining the impacts of the autonomous systems on emissions and energy efficiency compared with conventional control of the same vehicle.

A vehicle testing laboratory is equipped with a novel system for physically or electronically replicating the presence of one or more vehicles in a desired proximity to the vehicle being tested, based on the recorded proximity of real vehicles during a prior real-world drive, or for simulating the presence of one or more vehicles in a desired proximity to the vehicle being tested, based on a desired traffic scenario.

The testing laboratory is also equipped with either a traditional chassis dynamometer or rolls or, alternatively, a separate axle shaft dynamometer for each vehicle drive wheel, as well as mass emissions sampling equipment for testing ICE vehicles, where applicable, and a supplemental set of testing equipment for the purpose of exposing a test vehicle to a set of environmental conditions of interest, e.g. ambient temperature, pressure, and humidity, while the vehicle is being tested.

Prior to laboratory testing, a vehicle to be tested may be driven on any route(s) of interest in the real world, under any environmental and traffic conditions desired. For example, high traffic arteries in NAAQ "non-attainment areas" might be of particular interest to researchers and regulators. And cold weather fuel economy performance may be of particular interest to a manufacturer of vehicle models used more extensively by customers in colder climates.

During the real-world drive(s), a PEMS may be optionally installed on ICE equipped vehicles to measure and record mass emissions in grams per mile or grams per brake-horsepower-hour, depending on the regulatory emissions certification requirements for the vehicle. In addition to the optional emissions data, ambient weather conditions and other test parameters needed to characterize the vehicle operation are also recorded, including vehicle speed, accelerator pedal or throttle position, and brake pedal position or status (i.e. on/off) for the entire test period. For manual transmission vehicles, gear selection and clutch pedal position must also be recorded. For the methods that replicate following distance, following distance behind a lead vehicle is also measured and recorded using either a camera, radar, LiDAR or other relevant system.

After the real-world testing over the desired route(s), or after developing or deciding upon a desired cycle to be simulated, the vehicle is brought to the specially-equipped indoor or outdoor laboratory and placed on or connected to a dynamometer or rolls. The laboratory's mass emissions sampling equipment (in the case of the ICE vehicles) measures mass emissions and the supplemental set of testing equipment is employed for providing the desired environmental conditions of interest during vehicle operation, i.e. environmental conditions that may be the same or may be different from those actually encountered during the real-world testing.

The real-world following distance recorded during the real-world testing, or any desired real-world following distance to be simulated is uploaded to either the physical simulated vehicle apparatus, or the electronic simulated vehicle apparatus, as appropriate.

Alternatively, either testing apparatus simulates the presence of other vehicles "appearing" to the subject vehicle to be following a desired vehicle speed schedule, e.g. a regulatory speed cycle, or causing the subject vehicle itself to follow a desired vehicle speed schedule, e.g. a regulatory speed cycle. It is not known at this time whether regulatory speed cycles will be interpreted as "the speed of traffic" or the "speed of the test vehicle" in the future. Some of the proposed techniques provide a means for determining the impact of employing autonomous longitudinal speed control systems under either interpretation by comparing test results using the disclosed apparatus to test results for the same vehicles under conventional speed control.

The full set of real-world test conditions, inclusive of following distance behind lead vehicles and environmental conditions are either reproduced with reference to a prior real-world drive, or simulated as desired in the laboratory environment. The mass emissions or energy efficiency, depending on powertrain type, and other automated longitudinal control performance parameters are noted and recorded. Subsequent tests can be used to calibrate or improve the emissions, efficiency, or other performance measures of the vehicle or longitudinal control system.

If either PEMS emissions data or energy consumption was optionally collected for those methods including real-world driving, the PEMS data can then be directly compared with the laboratory emissions or energy consumption data collected during the laboratory test under the same conditions to ensure they are equal, within an acceptable range. This optional "validation" process serves to document a high degree of confidence that both the laboratory and real-world measurements are both correct and reproducible.

BRIEF DESCRIPTION OF THE DRAWINGS

FIG. 1A shows a physical apparatus for replicating or simulating the presence, motion, appearance, or disappearance of a vehicle or vehicle traffic dynamically leading a real, autonomously-controlled vehicle on a vehicle test stand while the autonomous vehicle emissions, energy efficiency, fuel economy, or automatic braking activity is measured or observed.

FIG. 1B depicts a "cut-in" traffic maneuver that can be simulated with the apparatus shown in FIG. 1A.

FIG. 1C depicts a "cut-out" traffic maneuver that can be simulated with the apparatus shown in FIG. 1A.

FIG. 2 shows an electronic apparatus for replicating or simulating the presence, motion, appearance, or disappearance of a vehicle or vehicle traffic dynamically leading a real, autonomously-controlled vehicle on a 2-wheel vehicle test stand while the autonomous vehicle emissions, energy efficiency, fuel economy, or automatic braking activity is measured or observed.

FIG. 3A shows a physical apparatus for replicating or simulating the presence, motion, appearance, or disappearance of a vehicle or traffic dynamically leading a real, autonomously-controlled vehicle on a 2-wheel vehicle test stand while the autonomous vehicle emissions, energy efficiency, fuel economy, or automatic braking activity is measured or observed.

FIG. 4 shows a top-view of an apparatus for replicating or simulating the presence, appearance, or disappearance of a vehicle or traffic dynamically leading a real, autonomously-controlled vehicle using a wheel hub dynamometer test stand while the autonomous vehicle emissions, energy efficiency, fuel economy, or automatic braking activity is measured or observed.

FIGS. 5, 6 and 7 show methods for simulating a vehicle drive under autonomous or automated longitudinal speed control in a laboratory.

DETAILED DESCRIPTION

Figure 3B:
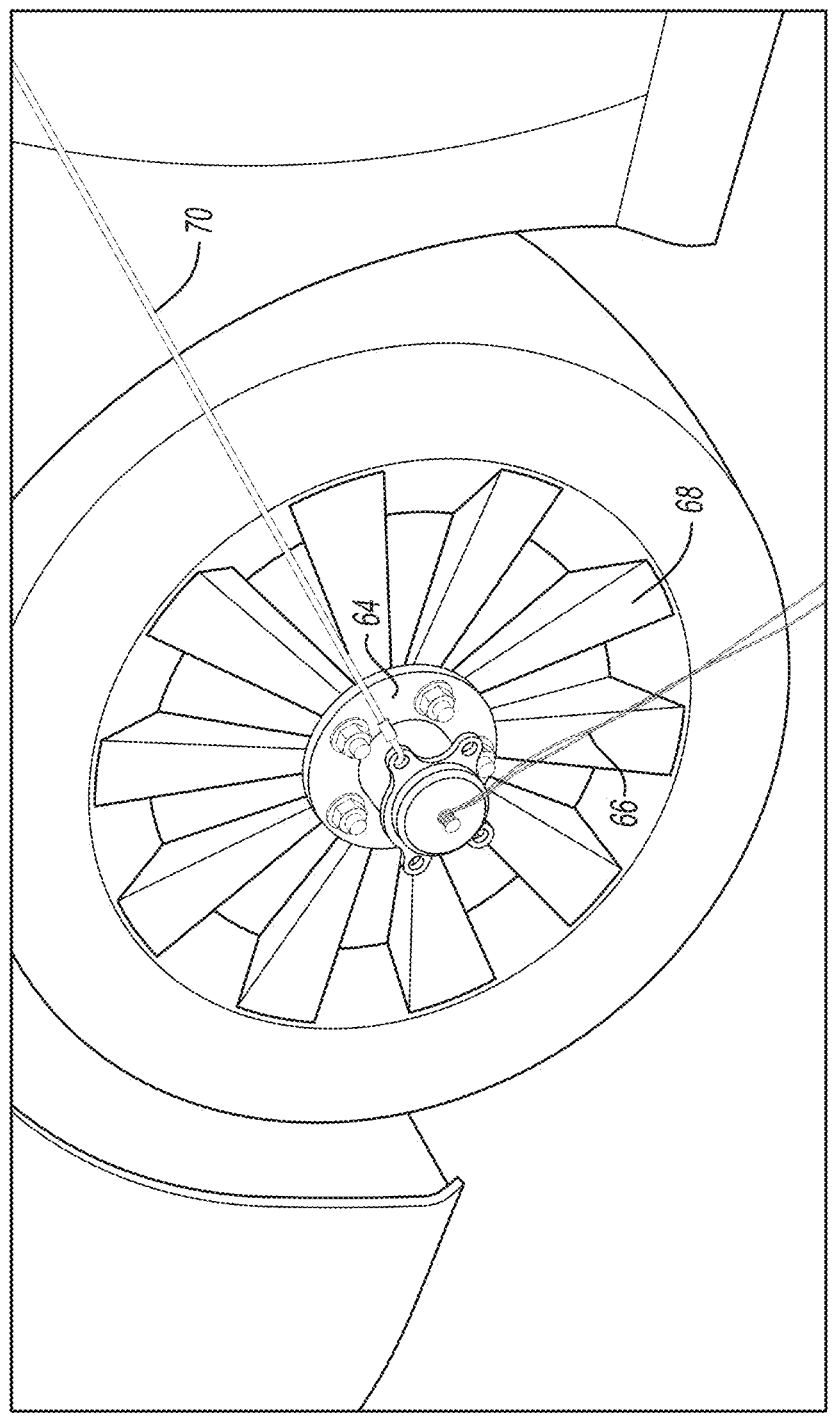
FIG. 3B shows a method for simulating valid wheel speed sensor signals to the wiring harness inputs of non-rotating wheel hubs of a vehicle with anti-lock brakes or autonomous controls, while the vehicle is operated on a 2-wheel vehicle test stand.

Various embodiments of the present disclosure are described herein. However, the disclosed embodiments are merely example and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Here, we replicate and simulate real-world driving conditions related to the flow of traffic, weather, vehicle road load, accelerations, and road grade, all of which affect the operation and control of vehicles that feature autonomous or automated longitudinal velocity control systems. These replicated driving conditions are necessary for accurately measuring emissions and energy efficiency, and for replicating automated braking activity in a laboratory environment, and for such measurements and activity to be representative of real-world operations.

It is well known to one of ordinary skill in the art that driving style affects the energy efficiency of all types of automobile powertrains and the exhaust emissions levels of powertrains employing Internal Combustion Engines (ICEs). Accelerator pedal movements, braking activities, and powertrain calibrations all impact the efficiencies and emissions of vehicles. But autonomous longitudinal speed control features on vehicles, e.g. Adaptive Cruise Control (ACC), supplant normal accelerator pedal inputs and braking activities of the driver and may depend upon a different set of powertrain calibrations while the vehicle is operating autonomously.

For conventional, non-autonomous vehicles, laboratory emissions testing is normally done with either a human driver or a robot driver controlling the vehicle over a desirable speed schedule or cycle, while the emissions are sampled, and the fuel economy is determined from the emissions. Electrical measurements provide a similar functionality for electric vehicles. But there are not yet acceptable apparatuses, or testing methods, for measuring emissions and fuel economy, or the energy efficiency of autonomous vehicles, e.g. those with ACC, so the emissions and energy efficiency can be compared with requirements, or corresponding values for the same vehicle operating in a conventional manner with a human or robot driver, for purposes of understanding the impacts of the autonomous operation on emissions and energy efficiency.

Example Apparatuses

Various example apparatuses are described below for purposes of measuring the exhaust emissions and fuel economies of vehicles with internal combustion engines or the energy efficiencies or automatic braking responses of any vehicles that have autonomous control of vehicle acceleration, deceleration, and braking.

At least one controllable and automated dummy or target body is either physically or virtually dynamically positioned relative to a subject vehicle while the vehicle operates with at least one autonomous, longitudinal speed control feature of interest activated, in conjunction with dynamometer or rolls operation, thus causing the vehicle speed control and braking to be affected by the changing relative location and speed of the target body. The one or more target body's relative location, speed, and acceleration can be controlled in either an open loop manner according to a setpoint schedule, or in a closed loop manner, based on feedback from the dynamometer or rolls, the test vehicle, or other installed measurement system such as an aftermarket autonomous vehicle camera system.

The vehicle target body possesses visual, radar, and LiDAR appearance characteristics that make it indistinguishable from a real vehicle by the detection systems of real autonomous vehicles located behind it. The target body location(s) and motion are controlled by a trolley system that rides along an overhead track, either to a commanded position, or to a commanded speed, relative to the subject vehicle. Alternatively, location and motion of a virtual target body is accomplished using a radar or LiDAR receiver/emitter system that receives radar or LiDAR signals from the subject vehicle, and then emits a radar "return" signal corresponding to the desired virtual location or motion of the target vehicle's relative location or motion.

For vehicle research and development purposes, the virtual target approach may be desirable because of its simplicity and testing efficiency. But for emissions and energy efficiency compliance purposes by regulatory authorities, it is often desirable to conduct a "blind test" for which no a-priori technical information is known about the subject vehicle being tested, and a test of the complete vehicle, without simulating any "fake" control signals. In this latter case, the real target approach may be more desirable.

FIG. 1A shows a Vehicle Longitudinal Speed Control Testing Apparatus (VLSCTA) 2 used to physically simulate the presence of interacting vehicles at variable following distances 4, 4' in front of a subject vehicle 6 in a vehicle testing laboratory. The VLSCTA 2 is capable of making simulated vehicles appear or disappear from in front of the subject vehicle 6, and simulating one or more leading vehicles moving at variable opening or closing speeds and variable following distances 4, 4' relative to the subject vehicle 6.

Movable target bodies 8, 8' with functional brake lights 10, 10' simulate the presence of other vehicles by providing visual appearances, radar cross-sections, and LiDAR appearance imaging characteristics like the rear surfaces of real vehicles. This causes the subject vehicle 6 to interact with the simulated vehicles, i.e. the movable target bodies 8, 8' as though the subject vehicle 6 was operating in the real world with real vehicles having the same relative locations and motions as the simulated vehicles.

The target bodies 8, 8' are suspended by position and speed-controlled trolley assemblies: an articulating trolley assembly 22, and a non-articulating trolley assembly 22', mounted above on a fixed track or rail 30. The motion of the target bodies 8, 8' is dynamically controlled in a desired manner, depending on the chosen mode of operation, by the motors and controls of the system (not shown). Suspension from above is advantageous to avoid the introduction of floor mounted objects that could be sensed, and which could alter the operation of the subject vehicle 6.

The target bodies 8, 8' are physical structures made of any material that provides a representative physical appearance or radar signature to the appropriate sensors of the subject vehicle 6 being tested, e.g. to individual optical cameras, optical camera systems, binocular cameras, radar transmitter/receivers, etc. Functioning tail lights 10, 10' simulate the application of the brakes of a leading vehicle to following vehicles that sense braking of other vehicles in this manner.

The target bodies 8, 8' are fixed to the articulating trolley assembly 22 and to the non-articulating trolley assembly 22' by rigid rod hangers 13, and 13', respectively. The articulating target body 8 is also fixed to a forward position of the articulating trolley assembly 22 by a rigid push/pull rod 11 and the non-articulating target body 8' is fixed to a forward position of the non-articulating trolley assembly 22' by a rigid rod 11'. The posterior trolley assembly 28 and the trolley assembly 28' are directly connected to independent drive mechanisms for controlling their speeds, positions, or accelerations, and hence the speed, position, or acceleration of the target bodies 8, 8' with respect to the subject vehicle 6.

The anterior trolley assembly 42 is also linked to the posterior trolley assembly 28 by linear actuator 46, thereby fixing the linear motion of the anterior trolley assembly 42 along the track or rail 30 relative to the driven, or posterior trolley assembly 28. The linear actuator 46 is caused to expand or contract by a separate control signal to cause the spacing between the posterior trolley assembly 28 and the anterior trolley assembly 42 to increase or decrease, respectively.

The states of simulated vehicles are defined by at least the set of parameters including, but not limited to, deployment status (in the case of target body 8 only), i.e. deployed in front of the subject vehicle 6 or raised above the roadway (and out of the virtual path of motion of the subject vehicle 6), following distances 4, 4' indicating the distances between the front of the subject vehicle 6 and the backs of the simulated vehicle target bodies 8, 8', and the relative speeds or "closing speeds" between the subject vehicle 6 and the simulated vehicle target bodies 8, 8'.

The articulated trolley assembly 22 and the non-articulated trolley assembly 22' are controlled to place the articulated target body 8 and the non-articulated target body 8' in any desirable state, either manually or programmatically in a synchronized manner with the operation of a dynamometer assembly 12 or rolls (not shown). When the actuator 46 is expanded, the anterior trolley assembly 28 is caused to move along the track or rail 30 in a direction away from the posterior trolley assembly 28, thereby pulling on the push/pull rod 11 and causing the target body 8 and rigid rod hanger 13 to quickly rotate together about the suspension axle 48, thereby quickly removing the target body 8 from being sensed by the subject vehicle 6 as an obstacle affecting the speed or control of the subject vehicle 6. In this way, the target body 8, combined with the functionality and control of the driven posterior trolley assembly 28 and follower anterior trolley assembly 42, allows the simulation of the presence or sudden appearance of a vehicle or obstacle in front of the subject vehicle 6, or between the subject vehicle 6 and a second simulated target body. The sudden appearance is also considered a "step change" in the deployment status of the target body 8 for simulating "cut-in" and "cut-out" traffic maneuvers.

FIG. 1B shows a "cut-in" maneuver (e.g. to simulate a lane change into the path of motion of vehicle 6), as well as the removal or disappearance of a vehicle 8 or obstacle from in front of the subject vehicle 6, as shown in FIG. 1C (e.g. to simulate a lane change out of the path of motion of vehicle 6), causing a "step change" in the magnitude of the following distance of the subject vehicle 6, behind a lead vehicle. This functionality can also be used to simulate a lead vehicle in the same traffic lane as the subject vehicle exiting from a road or highway.

Referring back to FIG. 1A, control of the target bodies 8, 8' is coordinated with the subject vehicle's 6 simulated drive, in coordination with the dynamometer assembly 12 that simulates real world vehicle loading conditions in the usual manner, or rolls (not shown). The target bodies 8, 8' are moved by control cables (not shown) connected to a motor drive (not shown) behind a drive cover 14. A posterior movable rail stop 16 and an anterior movable rail stop 18 engage with trolley stops 20, 20' to act as a fail-safe mechanism to prevent the articulating trolley assembly 22 and the non-articulating trolley assembly 22' from exceeding the design travel limits.

During laboratory testing employing the dynamometer assembly 12, exhaust gas, particulate matter, and particulate number analysis systems (not shown) may be used to measure the exhaust emissions exiting the vehicle tailpipe 24, by drawing a sample through a sampling hose 26 connected to a Constant Volume Sampling (CVS) system (not shown), where applicable, and the energy efficiency, drivability, and braking responses of vehicles with autonomous longitudinal speed or braking control may be studied or evaluated.

For vehicles that employ optionally-selected, longitudinal speed control, the impacts on emissions and energy efficiency of the autonomous control modes can be determined by using this apparatus to compare the emissions and efficiency results for tests conducted with the vehicle operating in an autonomous mode, with the results for tests conducted with the vehicle operating in a conventional mode, i.e. controlled by a human or robot driver, or by direct electronic manipulation of the vehicle controls over a test cycle.

The articulating trolley assembly 22 and the non-articulating trolley assembly 22' move along the trolley track 30 on rollers 32, 44, 32' in response to control signals from a programmable controller 34 (which may be optionally integrated into the test cell automation system) for commanding its position and speed toward or away from the dynamometer or rolls assembly 12. The controller 34 inputs are optionally selected to be either open-loop inputs coordinated with the dynamometer assembly 12 or rolls operation, or closed-loop inputs derived from calculations based on a vehicle speed signal from a dynamometer controller 36 or a rolls assembly, or the vehicle 6 itself, electronically communicating through a dynamometer or rolls communications cable 38, or through a separate electronic connection (not shown).

Direct, open-loop, dynamic signal inputs to the controller 34 cause the movable target bodies 8, 8' to move according to desired, dynamic following distance 4, 4' schedules between the subject vehicle 6 on the dynamometer assembly 12 or rolls, and the target bodies 8, 8', thereby simulating the existence of one or more vehicles to the autonomous system sensors of the subject vehicle 6, and causing the subject vehicle's 6 autonomous or automated control systems to react in accordance with its internal algorithms and calibrations.

In one mode of operation, the controller 34 is programmed to dynamically change the following distance 4 between the articulating target body 8, or the following distance 4' between the non-articulating target body 8', and the subject vehicle 6, to follow a predetermined following distance schedule to cause the vehicle to perform active speed or automatic braking control in a manner that replicates active speed and braking control actions while following a lead vehicle according to the same distance schedule during a prior road test, or road test to be conducted using the same vehicle type.

A following distance measuring device 40 is optionally installed on a subject vehicle 6 prior to road testing for which following distances are to be measured for subsequent replication or simulation in the laboratory, but not obtainable from the vehicle itself, or if it is desired to not monitor sensor-related data from the vehicle for any reason. The device, if used, may be an aftermarket autonomous vehicle control monocular or binocular camera system, or a radar-based, LiDAR-based, or laser-based system. The same following distance measuring device 40 can be used subsequently in the laboratory to provide a feedback system to provide the dynamic location of simulated physical vehicles.

In a second mode of operation, the controller 34 is programmed to dynamically change the following distance 4 between the articulating target body 8, or the following distance 4' between the non-articulating target body 8', and the subject vehicle 6 to cause the subject vehicle 6 speed to follow a desired vehicle speed schedule, e.g. a regulatory test cycle such as EPA's Urban Dynamometer Driving Cycle (UDDS) or Highway Fuel Economy Test (HWFET) cycle. Closed-loop operation of the controller 34, using a speed parameter from the dynamometer controller 36, rolls assembly, or from the subject vehicle 6 as feedback ensures the subject vehicle 6 follows the desired speed schedule closely.

If the absolute speed $v_a$ represents the articulated target body 8 or non-articulated target body 8' simulated real-world vehicle speed, and $v_d$ represents the speed of the subject vehicle 6 on the dynamometer assembly 12 or rolls assembly, i.e. the speed sensed by the subject vehicle 6 itself, or by the dynamometer controller 36, or rolls assembly, then $v_a$ can be defined by $$v_a = v_d + v_r.$$

where $v_r$ is the relative speed between the target body and the subject vehicle 6. $v_a$ is interpreted as the absolute simulation speed of the target body in a real-world reference frame. It is the analogous real-world speed of another vehicle being simulated by the motion of the target body in the real-world reference frame, which causes a subject vehicle 6 to react in the same manner it would react to a real vehicle, in the real world, if the real vehicle were at the same following distance 4 and were traveling at a speed equal to $v_a$.

In a third mode of operation, the controller 34 is programmed to dynamically change the following distance 4 between the target body 8 and the vehicle 6 to cause the absolute speed of the target body 8 (i.e. the speed representative of real-world road speed) to follow a desired absolute speed schedule, e.g. a regulatory test cycle such as EPA's UDDS or Highway Fuel Economy Test (HFET). By operating the target body 8 in this manner, the subject vehicle 6 is caused to operate as though it were operating in real traffic conditions where the "speed of traffic," rather than the speed of the vehicle itself, follows the speed of the desired or regulatory test cycle. The subject vehicle 6 itself does not follow the desired speed cycle, but operates as an autonomous vehicle embedded in traffic that is represented by the desired cycle. Therefore, emissions and energy efficiency measured during this type of operation are representative of measurements that would be obtained in the real world in real traffic flowing at the speed of the desired cycle.

The anterior trolley assembly 42 also moves along the trolley track 30 on anterior trolley rollers 44 and is variably connected to the posterior trolley assembly 28 by the actuator 46. While the posterior trolley assembly 28 and the anterior trolley assembly 42 generally move together along the track 30, optional extension of the actuator 46 causes the target body 8 to quickly rotate forward about the suspension axle 48, thereby causing the sudden disappearance of the target body 8 from obstructing the simulated forward motion of the subject vehicle 6. Retraction of the actuator 46 causes the target body 8 to quickly rotate rearward about the suspension axle 48, thereby causing the sudden appearance of the target body 8 as an obstruction to the forward motion of the subject vehicle 6. In this way, deliberate extension and retraction of the actuator 46 via controller 34 signals, causes the sudden appearance or disappearance of the target body 8, for simulating the sudden appearance or disappearance of a leading vehicle, as desired. This functionality is also effective for simulating lane changes from, or to, other simulated road lanes (not shown) using the target body 8, as described above.

It may be desirable to house the VLSCTA 2 assembly in a separate room adjoining to the dynamometer or rolls test cell room to isolate the motion of the target bodies 8, 8' from laboratory personnel. Or it may be desirable to house the VLSCTA 2 outdoors, but viewable to subject vehicle 6 sensors located in the indoor testing laboratory. A window 50 constructed of specialty glass that is transparent to light, radar signals, and LiDAR signals is optionally located between the VLSCTA 2 and the dynamometer assemblies 12, 60 (FIG. 3A), or roll assembly, for this purpose. This additional feature can be used for any of the testing modes described herein.

The testing laboratory may be contained in a climatically controlled chamber (not shown) for which ambient air conditions of pressure, temperature, and humidity can be individually controlled. Such a laboratory allows for replication or simulation of ambient air conditions to reflect prior real-world driving conditions to be replicated or simulated in the laboratory, or the simulation of specific ambient air conditions of interest, for maximum accuracy of test results and between tests intending to be identical except for a controlled variable.

Alternatively, a more cost-effective implementation for replicating and simulating dynamic ambient air conditions employs an "environmental conditions simulator" 52, recently made available commercially. It provides a less capital intensive means for dynamically changing ambient conditions experienced by a subject vehicle 6 powertrain during testing and for replicating and simulating desired ambient air conditions, while allowing the use, or continued use, of a standard emissions test laboratory. In this case, the ambient air pressure, temperature, and humidity conditions are created by the environmental conditions simulator 52 and applied only to the powertrain and necessary vehicle sensors by connecting the environmental conditions simulator 52 to the subject vehicle 6 engine intake air system, (not shown) by the intake air hose 56 and to the vehicle's tailpipe 24 by the exhaust gas hose 54. The environmental conditions simulator 52 controls the intake air pressure, exhaust backpressure, and intake air humidity to either fixed, selected values, or to programmatically controlled, dynamic values as desired, or to mimic the conditions recorded during a real-world test, properly synchronized with the subject vehicle 6 speed and load on the dynamometer assembly 12.

The apparatus of FIG. 1A can also be used in conjunction with a test method for testing the response of the subject vehicle 6 safety systems to leading vehicle "cut-in" maneuvers as shown in FIG. 1B and "cut-out" maneuvers as shown in FIG. 1C. For simulating cut in maneuvers, the subject vehicle is controlled by the presence of a leading vehicle, as described above. For example, the non-articulating target body 8' is controlled in one of the manners previous described, while the articulating target body 8 is controlled in a non-deployed state. At the appropriate time to simulate a cut-in maneuver, the target body 8 is quickly deployed between the subject vehicle 6 and the non-articulating target body 8, at which time the vehicle 6 response is noted or measured. This may be to determine the effectiveness of emergency braking or for measuring the reaction of any other vehicle 6 parameter to the "cut-in" maneuver.

To simulate a "cut-out" maneuver, as shown in FIG. 1C, the subject vehicle 6 is controlled by the simulated presence of a leading vehicle, represented by the articulating target body 8, located between the subject vehicle 6 and the non-articulating target body 8'. At the appropriate time to simulate a cut-out maneuver, the articulating target body 8 is quickly retracted or non-deployed, thereby causing the non-articulating target body to suddenly become the "new" leading vehicle, at which time the vehicle 6 response is noted or measured. This may be used to measure the reaction of any vehicle 6 parameter to the "cut-out" maneuver.

FIG. 2 shows an electronic Vehicle Longitudinal Speed Control Testing Apparatus (eVLSCTA) 63 used to electronically create one or more movable virtual target vehicles, simulating the virtual presence of interacting vehicles at simulated distances from, and at simulated speeds relative to a subject vehicle 6, thereby representing variable following distances from the subject vehicle, and traveling at variable speeds in relation to the subject vehicle 6 in a vehicle testing laboratory. The eVLSCTA 63 is capable of making simulated vehicles appear or disappear electronically from in front of the subject vehicle 6, and simulating leading vehicles moving at variable opening or closing speeds and variable following distances relative to the subject vehicle 6. The eVLSCTA 63 is comprised of an integrated test rack for simulating the presence of one or more other vehicles by providing one or more electronic radar receiver/transmitters 55 for receiving signals from the subject vehicle 6 radar transmitter/receiver, if equipped, broadcasting a signal corresponding to the desired, simulated relative locations and relative speeds of simulated vehicles in relation to the subject vehicle 6, one or more LiDAR receiver/transmitters 57 for receiving signals from the subject vehicle 6 LiDAR transmitter/receiver, if equipped, and emitting one or more signals corresponding to the desired, simulated relative locations of simulated vehicles in relation to the subject vehicle 6, and a display screen 61.

By controlling the locations and speeds of simulated target vehicles based on a speed feedback signal from the subject vehicle 6 the dynamometer controller 36, or rolls assembly, the subject vehicle 6 speed controls are forced to respond to the electronically simulated vehicle(s) as though the subject vehicle 6 was operating in the real world with real vehicles having the same relative locations and motions as simulated vehicles, in an analogous manner to the response of the subject vehicle 6 to the physical target body 8 motion as described above in greater detail.

FIG. 3A shows a testing apparatus for testing autonomous vehicles using a 2-wheel chassis dynamometer assembly 60 that only provides for two rotating drive wheels. In modern vehicles with anti-lock brakes and autonomous speed control, non-rotating wheels usually cause a malfunction state to be sensed by the vehicle's own diagnostic systems. Under such conditions it is not possible to test the vehicle as described above.

To test on a two-wheel dynamometer assembly 60, it is necessary for the subject vehicle's 6 diagnostic system to receive valid speed sensor inputs from each wheel speed sensor, including the non-rotating wheels 62 (only one shown). To do this, additional wheel hubs 64 (only one shown) comprising integrated wheel speed sensors, matched to the specific subject vehicle 6 make and model, are centerably fixed to the exterior of the drive wheels 68 (only one shown) on the 2-wheel dynamometer assembly 60. One way to accomplish this is to bolt the additional wheel hubs 64 to the drive wheel 68 hub studs or lug nuts so the additional wheel hubs 64 will rotate at the same speed as the drive wheels 68. More specifically, it may be advantageous to mount a non-rotating, left-side hub to the exterior of the rotating, right-side wheel, and vice versa because some vehicle hubs sense reverse rotation. The additional wheel hubs 64 are prevented from freely rotating (due to internal bearing friction), by the anti-rotation straps 70 (only one side shown).

Prior to testing, the subject vehicle's 6 original wheel hub speed sensors, integral to the non-rotating wheel hubs while operating on the 2-wheel dynamometer assembly 60, are disconnected from the subject vehicle 6 wiring harness inputs (not shown). The additional hubs' 64 integral speed sensors (not shown) are connected with an extension wiring harness 66 to the wiring harness inputs in a cross-wise pattern, i.e. the right drive wheel externally-mounted hub is connected to the vehicle 6 wiring harness at the location of the left non-drive wheel hub, and vice versa, because some wheel hub sensors also sense reverse motion. Because the additional drive wheel hubs 64 have to be rotated 180 degrees in relation to the non-drive wheel hubs to be mounted on the external side of the drive wheels 68, they would appear to be rotating in the opposite direction than desired if not connected cross-wise.

FIG. 3B shows a closer view of the additional wheel hub 64 mounted on a drive wheel 68 of a vehicle 6 as described.

FIG. 4 is a top view showing how the Vehicle Longitudinal Speed Control Testing Apparatus (VLSCTA) 2 is used to physically simulate the presence of interacting vehicles at variable following distances 4 from a subject vehicle 6 in a vehicle testing laboratory employing drive-axle dynamometers. In place of the chassis dynamometer assembly 12 or the two-wheel dynamometer assembly 60, individual drive-axle electric dynamometers 102, 104, 106, 108 are used to provide realistic, real-world loading to the vehicle 6 in the usual manner.

For ease of installation and efficiency of testing, specialized drive wheels 70, 72, 74, 76, with integral axle shaft bearings and locking hubs 78, 80, 82, 84 are mounted on the test vehicle 6, in place of the normal wheels. The dynamometers 102, 104, 106, 108 are movable, may be conveniently mounted on a bed plate (not shown), and serve the same function as the chassis dynamometers 12, 60.

The specialized wheels 70, 72, 74, 76 with integral axle shaft bearings and locking hubs 78, 80, 82, 84 allow the drive axle shafts 86, 88, 90, 92 to freely rotate within the integral axle shaft bearings, i.e. allow selectable disconnection from the wheels (i.e. "freewheeling") when "unlocked" during testing. The axle shafts 86, 88 90, 92, however, engage the dynamometer input shafts 94, 96, 98, 100 when the dynamometers are installed. When they are set to the "locked" positions, the drive axle shafts 86, 88, 90, 92 are connected to the specialized wheels 70, 72, 74, 76 in a normal manner so the vehicle can be driven and moved to the desired location for testing. Except for this alternative means for applying real-world load to the vehicle, testing with this apparatus is conducted similarly to the testing with the other dynamometer apparatuses described above.

In some examples, a vehicle longitudinal speed control testing apparatus comprises a first movable target body spaced away from a vehicle executing active speed control while loaded by a dynamometer assembly. The vehicle longitudinal speed control testing apparatus also comprises a controller programmed to change a distance between the first movable target body and the vehicle to cause (i) a speed parameter of the vehicle to follow a desired vehicle speed schedule based on speed parameter feedback from the dynamometer assembly or the vehicle, (ii) a sum of a speed of the first movable target body and the speed parameter feedback to follow a desired absolute speed schedule, or (iii) the distance between the first movable target body and the vehicle to increase according to a desired distance schedule.

The apparatus may further comprise a second movable target body spaced away from the vehicle, wherein the controller may be further programmed to change a deployment status of the first movable target body to cause a step change in distance between a closest one of the first and second movable target bodies and the vehicle. The apparatus may further be programmed to change a distance between the second movable target body and the vehicle to cause the sum to follow the desired absolute speed schedule while the first movable target body is undeployed. The apparatus may further comprise an atmospheric simulation chamber enclosing the dynamometer assembly or an atmospheric simulation system configured to provide conditioned air to a powertrain or exhaust system of the vehicle. The dynamometer assembly may be a chassis dynamometer configured to provide a rotational force to one or more rotating wheels of the vehicle, and the apparatus may further comprise hub assemblies including wheel speed sensors mounted on the rotating wheels outboard of the vehicle and electrically connected to non-rotating wheel speed sensor inputs of the vehicle. The apparatus may further comprise a surface transparent to light, light detection and ranging signals, or radar signals disposed between the movable target body and the vehicle.

In some examples, a vehicle longitudinal speed control testing apparatus comprises a first electronic virtual target simulator configured to operate in conjunction with a vehicle executing active speed control while loaded by a dynamometer assembly. The vehicle longitudinal speed control testing apparatus also comprises a controller programmed to change an output signal of the first electronic virtual target simulator to cause (i) a speed parameter of the vehicle to follow a desired vehicle speed schedule based on speed parameter feedback from the dynamometer assembly or the vehicle, (ii) a sum of a simulated speed of a virtual movable target simulated by the first electronic target simulator and the speed parameter feedback to follow a desired absolute speed schedule, or (iii) a simulated distance between the virtual movable target and the vehicle to increase according to a desired schedule. The apparatus may further comprise a second electronic virtual target simulator configured to operate in conjunction with the vehicle, wherein the controller is further programmed to change a deployment status of the virtual movable target to cause a step change in the simulated distance. The apparatus may further comprise an atmospheric simulation chamber enclosing the dynamometer assembly or an atmospheric simulation system configured to provide conditioned air to a powertrain or exhaust system of the vehicle. The dynamometer assembly may be a chassis dynamometer configured to provide a rotational force to one or more rotating wheels of the vehicle, and the apparatus may further comprise hub assemblies including wheel speed sensors mounted on the rotating wheels outboard of the vehicle and electrically connected to non-rotating wheel speed sensor inputs of the vehicle.

Example Methods

Numerous example testing methods for accurately measuring the fuel economy and exhaust emissions of vehicles employing active control of longitudinal speed, acceleration, or following distance while they are caused to follow a specific vehicle speed cycle, or while they are caused to operate within simulated traffic flows, represented by following simulated vehicles with controlled vehicle speed cycles are described below. Other testing methods are for additionally determining the effects of longitudinal motion control calibrations and algorithm changes by quantifying the impacts of the longitudinal control systems on energy efficiency, fuel economy, or emissions for any vehicle type, as applicable.

Additional testing methods for measuring the performance of vehicle safety features employing longitudinal speed, acceleration, or distance control will also be described. For example, testing the performance and effectiveness of emergency braking systems using simulated traffic scenarios.

Each of the example laboratory testing methods involve replicating or simulating the total, variable force acting on a vehicle using a dynamometer. The force can be a replicated force that acted on the same vehicle, or a similar vehicle, during a preceding real-world drive, or a simulated, estimated force that approximates the force that would act on the vehicle in the real world under similar testing conditions, e.g. based on vehicle speed and road grade conditions. The total force could be based on the combination of numerous factors, including, but not limited to vehicle mass, acceleration rate, speed, road grade, ambient atmospheric conditions, and autonomous control system behavior resulting from reactions to nearby vehicles, or may be based on simulated forces of interest.

Dynamometer testing usually employs a variable speed fan, placed in front of a subject vehicle 6 to simulate on-road air flow through powertrain radiators for cooling, and under the subject vehicle 6 for simulating the cooling effect on exhaust aftertreatment. Alternatively, a smaller variable-speed fan is sometimes used to provide cooling to the radiator(s) of the vehicle 6, with optional "side-cooling" for the aftertreatment. For the laboratory testing, radiator cooling must be provided in a different manner than usual because a cooling fan placed in front of the subject vehicle 6 may interfere with one or more of the autonomous vehicle control sensors. One cooling option is to draw air through the engine compartment from below the vehicle with the hood in a closed position, thereby drawing air through the radiator. Another option is to use a smaller fan in front of the vehicle, outside the view of the various sensors. This option requires some understanding of the autonomous sensors of the vehicle, however. Either option can be used to cause cooling air flow through the subject vehicle's 6 radiator(s) and may require removing or modifying some of the cover panels on the bottom of the vehicle that have become commonplace in recent years.

Each of the example testing methods involves a second element for replication or simulation of the desired changing ambient environmental conditions, coordinated with the application of the simulated load on the vehicle. The desired conditions may be based on actual ambient conditions experienced during a prior road test or may be based on simulating any other conditions of interest. This may be accomplished by subjecting the entire vehicle to the desired conditions using an environmental chamber, or by subjecting only the powertrain and relevant sensors to the desired conditions, e.g. by conditioning the engine intake air pressure, temperature, and humidity and by providing the appropriate exhaust flow backpressure, in the case of an ICE powertrain. An apparatus for doing this is described above. Enclosing relevant sensors in the same environmental conditions may also be necessary, depending on the vehicle design.

Each of the example testing methods involves a third element for causing a subject vehicle to employ the same powertrain and safety feature calibrations that would be employed in real world operation under the same conditions defined by actual or simulated vehicle load, actual or simulated ambient environmental conditions, and actual or simulated traffic conditions. Actual traffic conditions can be simulated by a physical or electronic simulation of one or more vehicles, in appropriate coordination with the location, speed, and acceleration of the subject vehicle 6 being tested.

A fourth element of each of the example testing methods involves the measurement of exhaust emissions, in the case of ICE vehicles, and the measurement or determination of the energy efficiency or fuel economy of the powertrain or vehicle. In the case of ICE vehicles, exhaust gas gaseous and particulate emissions are sampled and compared with the relevant regulatory standards or other metrics for R&D purposes, and in the case of electric vehicles, energy consumption measurements are made in the normal manner. For laboratory tests that are preceded by a real-world, on-road test, PEMS emissions measurements and vehicle speed may be continuously recorded. The PEMS data can then be used to validate subsequent laboratory tests in which the on-road vehicle speed schedule, road grade, and ambient conditions are simulated in the laboratory.

FIGS. 5-7 show various example test methods for measuring the exhaust gas emissions and fuel economy of vehicles, or assessing the performance of emergency braking or other defensive safety features of a vehicle possessing autonomous longitudinal speed, distance, or acceleration control, or relevant safety features, while the vehicle load, ambient conditions, and relevant traffic conditions are either replicated or simulated. These methods require the simulation of appropriate total road load, using a dynamometer with road load control capability based on vehicle dependent road load coefficients and by simulating the effects of the vehicle mass and road grade. By performing testing according to these methods, the emissions and energy efficiency of vehicles possessing such autonomous longitudinal control can be compared to the same, or similar vehicles under different sets of ambient weather and traffic conditions, or the same or similar vehicles with different powertrain or autonomous control calibrations. In this way, the methods are useful for calibrating powertrains, autonomous vehicle sensors and algorithms for performance and safety purposes, and for determining the effect of autonomous longitudinal control features on the energy efficiency and exhaust emissions of vehicles for regulatory purposes.

The example test methods shown in FIGS. 5-7 are conducted with a dynamometer configured for "road load control" mode, a common operational mode for which the dynamometer is programmed to provide a load that is based, at least in part, on loading that is a function of vehicle speed. This speed dependent term can be a function of other parameters itself, for example ambient air conditions, while an additional parameter typically accounts for the replication or simulation of road slope or gradient. Any dynamometer capable of this functionality is suitable, including a chassis dynamometer 12, a chassis dynamometer 60, and the wheel hub dynamometers 102, 104, 106, 108. One of ordinary skill in the art will also understand the method can be applied to testing using an engine-in-the-loop approach using an engine dynamometer.

Any of the example test methods shown in FIGS. 5-7 can optionally employ an ambient atmospheric conditions simulator 52 or, alternatively, a whole-vehicle "environmental testing chamber" for conducting accurate testing when the desired weather conditions differ from the laboratory ambient conditions that happen to be available.

The test methods shown in FIGS. 5-7 may be optionally preceded by a real-world road test to obtain emissions and/or energy efficiency data for later use in validating laboratory simulations of the same real-world environmental conditions, prior to subsequent testing at different environmental conditions, or prior to modifying the vehicle and/or calibrations and retesting to determine the effects of the changes, or for obtaining and recording a real-world speed schedule, ambient weather conditions, and a real-world "following distance" schedule for use in subsequent laboratory simulations of the real-world drive. Alternatively, a real-world test can be avoided if operation over a known speed or following distance schedule is desired, and if laboratory validation is not required.

Referring to FIG. 5, the first example testing method 110 pertains to testing an autonomous vehicle caused to operate in accordance with a desired speed schedule, e.g. a regulatory speed-based test cycle, or a speed cycle obtained from a prior real-world drive, as described above. In this case, the VLSCTA 2 apparatus is used to simulate external traffic conditions that cause the subject vehicle 6 to control its longitudinal speed in accordance with the desired speed cycle. The method allows one to obtain exhaust emissions, fuel economy or energy efficiency measurements, and automated braking activity, for an autonomous vehicle, that is representative of real-world measurements for any real-world route or desired vehicle speed schedule under dynamic ambient conditions. This is done while either replicating pre-determined real-world load and ambient condition schedules, or by simulating desired real-world load and ambient condition schedules of interest, as described above.

A real-world or other vehicle speed schedule and associated road grade schedule are chosen by the researcher for his or her purposes. For example, the simulated route may be a high traffic volume, light-duty passenger car commuter corridor during rush hour, or may be a long-duration route inclusive of a number of sub-routes that are each high volume commuter corridors, or may be any other route of interest to either regulators or automobile manufacturers, or the test route may be represented by an existing speed and road grade schedule.

In the case of acquiring real world schedules, the vehicle 6 is driven on the desired road route with the autonomous speed control setpoints set as desired, and recorded, while also recording the resulting vehicle speed schedule, road grade schedule, and ambient weather conditions schedules, including but not limited to ambient pressure, ambient temperature, and humidity. An onboard "weather station" can be temporarily installed and used to provide a continuous update of ambient atmospheric conditions from which atmospheric pressure, temperature, humidity, and air speed measurements are all recorded at an appropriate frequency, e.g. 1 Hz. Otherwise an alternative speed schedule and road grade schedule are chosen or created, depending on the goals of the testing. The chosen speed schedule is uploaded into the VLSCTA controller 34 or the eVLSCTA controller and the appropriate dynamometer loading parameters are entered into the dynamometer control 36 in the usual manner.

At operation 112, an optional road test can be run to obtain route, vehicle speed, grade, and weather schedules. At operation 114, speed may be chosen from a road or other desired schedule. At operation 116, the vehicle is applied to the dynamometer. At operation 118, ACC controls may be set where applicable. At operation 120, replication or simulation of ambient atmospheric conditions may be initiated. At operation 122, a simulated vehicle may be operated with closed-loop control to effect vehicle speed using subject vehicle speed feedback.

Referring to FIG. 6, the second example testing method 124 is based on open-loop control of "following distance" 4. If the subject vehicle's autonomous sensors' outputs provide an accessible parameter indicating following distance and can be recorded and interpreted, the following distance can be subsequently replicated with the VLSCTA 2 or eVLSCTA apparatus in the laboratory to replicate the road test. If following distance is not an accessible parameter and it is desirable to replicate the test based on this parameter, a separate vehicle-to-vehicle following distance measurement apparatus can be temporarily installed. For example, an aftermarket autonomous vehicle monocular or binocular camera system, radar system, or LiDAR-based system, with continuous following distance output, or other electronic system can be used for this purpose.

For an ICE subject vehicle 6, a Portable Emissions Measurement System (PEMS) may be optionally used to collect real-world tailpipe emissions and fuel economy (by carbon balance technique) data for the road test, or other means, e.g. a fuel flow meter (not shown) may be used to obtain optional direct fuel consumption data for later comparison. For a BEV vehicle 6, electrical power consumption is optionally recorded over the entire real-world drive using electrical means commonly used in the field (not shown).

Data logging from the vehicle 6 Controller Area Network (CAN) bus or On-Board Diagnostics (OBD) port is one option for recording vehicle operating parameters, including vehicle speed and autonomous control data items. If it is desirable to avoid connecting to the CAN bus for any reason, other commercially available speed measurement means could be employed, e.g. a GPS receiver or other means.

At operation 126, an optional road test can be run to obtain route, vehicle speed, grade, and weather schedules. At operation 128, a following distance schedule may be chosen from a road or other desired schedule. At operation 130, the vehicle is applied to the dynamometer. At operation 132, ACC controls may be set where applicable. At operation 134, replication or simulation of ambient atmospheric conditions may be initiated. At operation 136, a simulated vehicle may be operated with open-loop control to set the following distance.

For either example method 110 (FIG. 5) or example method 124, whether or not the vehicle underwent a prior road test, the vehicle 6, or part of a vehicle to be tested (e.g. an engine or powertrain) is brought into the test laboratory and placed on or connected to a dynamometer assembly, according to normal procedures for the appropriate type of dynamometer. For example, the chassis dynamometer 12, or the chassis dynamometer 60, or the drive axle dynamometers 102, 104, 106, 108, are all sufficient. Other dynamometers may also be used.

The same autonomous speed control settings used during road testing, if applicable, are entered into the vehicle 6 longitudinal speed control system, e.g. the vehicle speed setpoint(s) for an adaptive cruise control system. This vehicle speed setpoint can be the highest speed value of the selected speed cycle, or it can be higher, if it is desired to only input a single value for the entire test cycle. The speed setpoint can also be lower than the maximum value of the selected speed cycle as long as the driver or robot provides updated values during the test, replicating or simulating the actions of the human driver on the road, to allow the vehicle 6 to achieve the desired speeds as time progresses. In either case, the setpoints should be the same as the real-world setpoints if it is desirable to replicate a real-world drive.

Prior to beginning a test, the desired dynamic environmental conditions are selected or programmed into the environmental control system, i.e. into the control system for the associated environmental chamber (not shown) or powertrain "environmental conditions simulator" 52. Whenever the laboratory environmental conditions will differ significantly from the desired environmental conditions, e.g. when simulating a real-world road drive in different weather conditions, artificially maintaining the appropriate environmental conditions is important for causing the powertrain to operate in the appropriate calibration space, thereby generating representative emissions and exhibiting a representative energy efficiency.

Once testing commences, the vehicle controls its own speed automatically according to its longitudinal speed control system's embedded algorithms, calibrations, and user-selected setpoints.

For the first example test method 110 (FIG. 5), closed-loop control of the subject vehicle 6 speed to a reference speed schedule, either one recorded during a prior real-world test of the subject vehicle 6, or another reference cycle of interest, e.g. a regulatory speed cycle, can be accomplished by varying the following distance 4 dynamically in continuous response to the difference between the subject vehicle 6 or dynamometer speed and the speed schedule, e.g. by employing a PID loop or other feedback control.

Dynamically positioning the target body 8 or a virtual target in this closed-loop fashion continuously changes the following distance 4 or the rate of change of following distance 4. The effect on the autonomous subject vehicle 6 being tested is to cause the vehicle longitudinal control system and safety systems to respond to the target body 8 motion, or virtual target simulated motion and proximity in the way it would respond to a real vehicle, with the same relative motion and the same relative proximity, under the same environmental, vehicle speed, and vehicle load conditions as during the laboratory test.

In the case of the physical target body 8, simulated lane changes of a lead vehicle, i.e. simulating the change of lanes from the same "virtual" lane sensed by the vehicle 6, to an adjacent lane is accomplished by quickly raising the target body 8 above the test vehicle 6 height by extending the actuator 46 quickly, causing the rotation of the support rod 10 about the suspension axle 48. This action causes the simulated vehicle or target body 8 to be quickly removed as an obstacle, or to no longer be recognized as a leading vehicle by the longitudinal control system of the subject vehicle 6.

A simulated vehicle can also be made to quickly appear as a lead vehicle in front of the subject vehicle 6 by setting the following distance 4 via the trolley assembly 22 while the target body is held extended and above the subject vehicle 6, then quickly deploying the target body 8 by contracting the actuator quickly 46. In this way, the sudden appearance of a lead vehicle can be simulated, causing the subject vehicle 6 longitudinal control system, including the braking system, to react. Exhaust emissions, fuel economy, and/or safety features are monitored throughout the process, as desired for the purposes of the testing.

Testing proceeds in this way until reaching the end of the chosen speed schedule. If the test was a validation test, as described above, the emissions and energy efficiency results are checked for agreement with the real-world test results. Good agreement should be obtained when the testing is done properly. Changes or calibration changes to the subject vehicle 6, its emissions control system, or its autonomous control system can be made, and additional tests run under the same speed schedule, road grade simulation, and environmental conditions, to optimize or calibrate the vehicle systems for maximum efficiency, minimum emissions, or drive quality. If the autonomous speed control system can be disengaged, depending on the subject vehicle 6 control options, the test can be rerun with a human or robot driver controlling the vehicle speed to the same speed schedule and with the same weather and load conditions. The differences in the emissions and efficiency results indicate the impact of the autonomous speed control system on the emissions and efficiency for those conditions and speed schedule.

Subsequent dynamometer tests can also be conducted for the purpose of evaluating or demonstrating changes to the emissions and/or energy efficiency of the same vehicle operating in the same manner, but with different environmental or ambient conditions.

The second example method 124 differs in its use of open-loop control of following distance by controlling the following distance 4 according to a recorded following distance schedule obtained during a prior road test. This is one method for ensuring the subject vehicle 6 speed is controlled according to the real-world test speed schedule. Of course, any other open-loop control of the following distance can be used for studying the subject vehicle 6 behavior in various traffic scenarios and automated braking scenarios.

A third example method 138, shown in FIG. 7, relates to testing autonomous vehicle 6 emissions, energy efficiency, fuel economy, or automated braking activity while operating in real-world traffic conditions by causing the vehicle 6 to be constrained by simulated traffic, flowing according to a desired speed schedule, e.g. a regulatory speed-based test cycle. In this case, simulated vehicles, either physical or electronically generated, and leading the subject vehicle as necessary, define the traffic conditions and cause the subject vehicle to control its longitudinal speed cooperatively with the simulated vehicles to maintain vehicle separation according to the vehicle's embedded algorithms and calibrations. The method allows one to obtain test results that are representative of real-world measurements under the same conditions. Simulation of the entry and exit of lead vehicles in relation to a subject vehicle can also be advantageously employed.

A desired traffic speed schedule is selected or created by the researcher for his or her purposes to serve as the traffic, or simulated vehicle absolute speed schedule, and loaded into the VLSCTA 2 or eVLSCTA control system 34. For example, it may represent the speed of a high traffic volume, light-duty passenger car commuter corridor during rush hour, or may be a long-duration speed schedule inclusive of several sub-schedules that are each high-volume commuter corridors, or may be any other schedule of interest to either regulators or automobile manufacturers.

A vehicle 6 with autonomous or automated longitudinal speed control features to be tested is brought into a test laboratory and placed on, or connected to, a dynamometer. A single, or multiple time-dependent autonomous speed control settings are chosen and entered into the subject vehicle 6 control system prior to the test, or as the test progresses, respectively. For example, a single vehicle speed setpoint for an adaptive cruise control system can be set to the highest value of the traffic speed schedule, or can be changed, as desired, to simulate how a real driver may change the settings in the real world.

Prior to operating the vehicle on the dynamometer, the appropriate, road load parameters for the test vehicle 6, the appropriate road grade parameters for the route, and the dynamic environmental conditions are selected or programmed into the environmental control system, i.e. into the control system for the associated environmental chamber or powertrain "environmental conditions simulator" 52. In cases where the laboratory environmental conditions differ significantly from the desired environmental conditions, e.g. when simulating a real-world road drive in controlling traffic at different weather conditions, maintaining the appropriate environmental conditions is important for causing the powertrain to operate in the appropriate calibration space, thereby generating representative emissions and exhibiting a representative energy efficiency.

Once testing commences, the vehicle speed is automatically controlled directly by the vehicle's longitudinal speed control system according to its embedded algorithms and calibrations, and based on sensor inputs related to the location and motion of the target body, either the physical target body 6 or a virtual, electronically-generated target body. The target body speed and direction of motion is controlled by continuously comparing the current speed schedule value with speed signal feedback from the dynamometer or vehicle. The dynamic relative speed setpoint, i.e. the speed of the target body relative to the vehicle, is determined by $$v_r = v_a - v_d$$

where $v_a$ represents the absolute real-world traffic speed, which is equal to the current speed schedule value, and $v_d$ represents the speed of the vehicle operating on the dynamometer, either from a vehicle 6 speed sensor feedback or from a dynamometer speed signal feedback from the dynamometer control unit 36.

Closed-loop control of the target body 8 or virtual target speed is accomplished by continuously varying the speed of the target body 8, or virtual target, according to continuously updated values of $v_r$. While under the test conditions described above, this causes the vehicle 6 longitudinal control system and safety systems to respond to the target body 8 motion, or virtual target simulated motion and proximity in the same way it would respond to real vehicles leading it in the real world, and traveling at an absolute road speed schedule equal to the chosen speed schedule, with the same relative motion and the same relative proximity, under the same environmental, and traffic conditions.

Testing proceeds in this manner until reaching the end of the chosen speed schedule. When testing is conducted according to this method, the emissions and energy efficiency results will agree with real-world test results in which real vehicles lead a subject test vehicle and moves according to the same absolute vehicle speed schedule. Changes can then be made to the subject vehicle 6, its emissions control system, or its autonomous control system, with subsequent retesting under the same traffic speed, grade, and environmental conditions, to optimize the vehicle systems for maximum efficiency, performance, or minimum emissions. If it is possible to disengage the autonomous speed control system, a test can be rerun with a human or robot driver controlling the vehicle 6 speed to the same $v_d$ speed schedule and with the same weather, and distance-based road grade conditions. The differences in the emissions and efficiency results indicate the impact of the autonomous speed control system on the emissions and efficiency for the same speed schedule.

Alternatively, after disengaging the autonomous speed control system, the test can be rerun with a human or robot driver controlling the vehicle speed to the speed of traffic, or the $v_a$ speed schedule. In that case, the differences in the emissions and efficiency results indicates the impact of the autonomous speed control system caused by the longitudinal speed control system in engaging with traffic at the prevailing traffic speed, rather than continuously moving at the speed of traffic.

At operation 140, an optional road test can be run to obtain route, vehicle speed, grade, and weather schedules. At operation 142, speed may be chosen from a road or other desired schedule. At operation 144, the vehicle is applied to the dynamometer. At operation 146, ACC controls may be set where applicable. At operation 148, replication or simulation of ambient atmospheric conditions may be initiated. At operation 150, a simulated vehicle may be operated with closed-loop control to effect lead vehicle speed using subject vehicle speed feedback.

Figure 8:
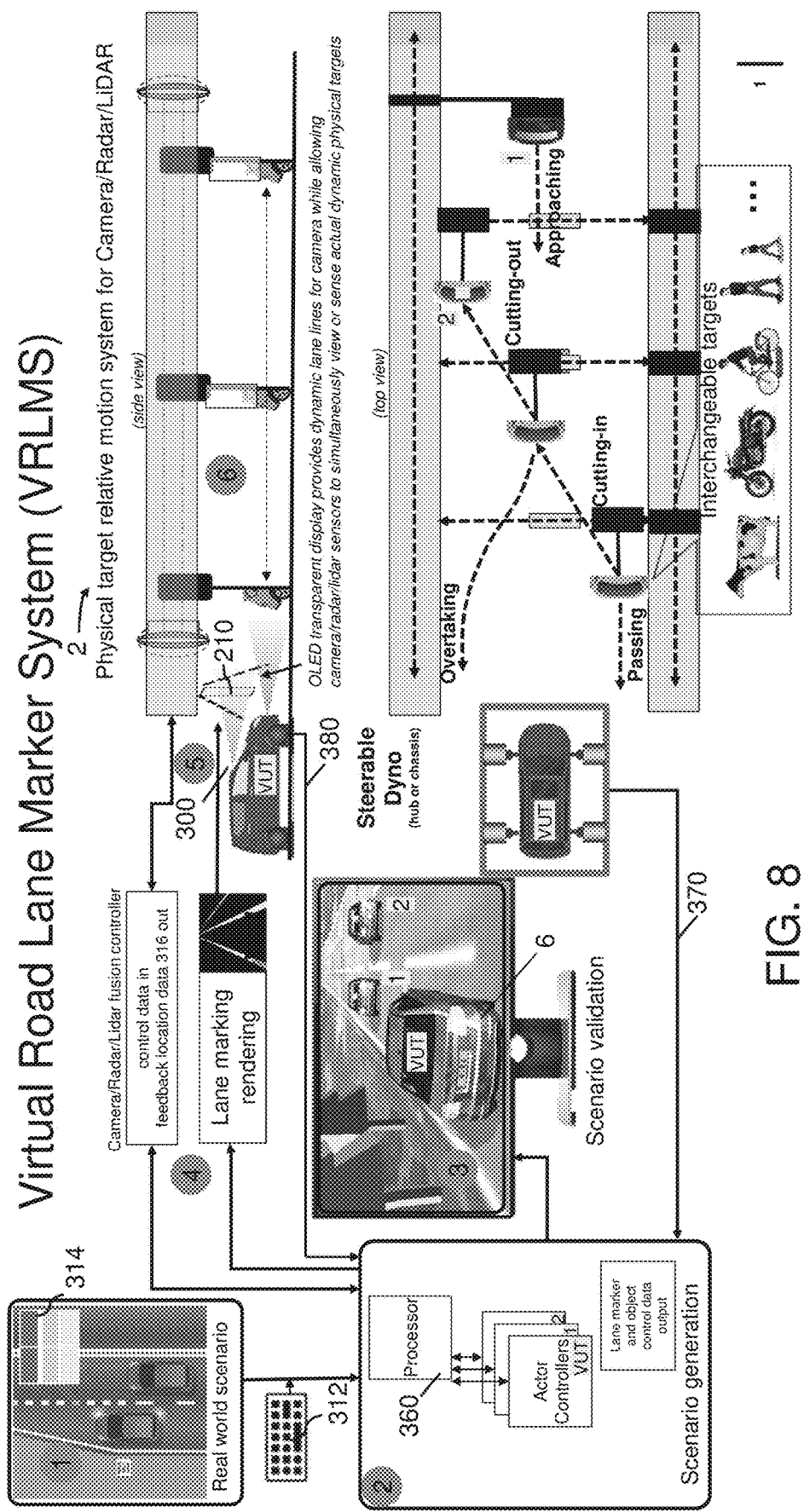
FIG. 8 shows an apparatus for testing a camera-based autonomous or semi-autonomous vehicle or system in a laboratory.

An example road lane marker generation and virtual display system test apparatus, (heretofore referred to as a Virtual Road Lane Marker System (VRLMS) 310 for testing a camera-based autonomous or semi-autonomous vehicle 6 or vehicle control system is shown in FIG. 8. The VRLMS 310 comprises: (1) A real-world scenario selection database, itself comprising optional roadway geometry and features data, e.g. lane marking data, to choose from. Alternatively, such data can be manually entered using the keyboard 312; (2) a processor for generating virtual lane marker data and outputting coordinated lane marker data and physical target controller data, and optionally, during closed-loop control, receiving object or target location feedback data; (3) a scenario validation display for visual inspection and validation of a chosen test scenario; (4) a transparent or semi-transparent screen for lane marker display from a projector (not shown), or alternatively, a transparent or semi-transparent monitor for lane marker display 210, e.g. a transparent OLED video display. The VRLMS 310 is capable of outputting coordinated control data for the display of virtual lane markers, in conjunction with control data for controlling a physical body simulator, e.g. the VLSCTA 2, as well as receiving optional feedback indicative of the temporal locations or motions of any simulated physical bodies from the physical body simulator, e.g. the physical target bodies 8, 8', 218 that may be used in masking the virtual lane markers 220.

The VRLMS 310 comprises data input channels for electronically receiving test configuration data and roadway design data from a test engineer via a keyboard 312 or related test system (not shown), simulated or real object speed or location schedule data 314 associated with a real-world traffic scenario for optional open-loop object operation, or feedback location data 316 from an electronic or physical object, or target body simulator, e.g. a VLSCTA 2, and simulated vehicle speed data from a related test system, e.g. a laboratory dynamometer, rolls, or the vehicle itself, a processor for generating virtual lane marker data based on at least the test configuration data and the roadway design data, a data output channel for electronically outputting at least a subset of the virtual lane marker 220 data representative of how real lane markers would appear from the location of an autonomous or semi-autonomous vehicle camera when projected or displayed on a transparent or semi-transparent display screen or monitor.

Prior to starting a laboratory test of a vehicle 6 or a vehicle autonomous control system (not shown separately) operating with control input from at least one camera 300, the vehicle 6 or autonomous control system is placed on, or in proximity to a laboratory apparatus that is located behind a VLSCTA 2 (described above), or other similar apparatus for simulating physical target bodies 8, 8', 218. In the case of a whole vehicle 6 test, the laboratory apparatus could be a dynamometer 12 for applying a load to the vehicle, a roller assembly (not shown) allowing simulated vehicle motion, or similar. In the case of a vehicle autonomous control system testing in the absence of a complete vehicle, the laboratory apparatus could be a simple structure or jig for mounting the various autonomous system sensors, e.g. radar, LiDAR, and camera sensors in the relative desired locations.

An electronic simulator, e.g. a VRLMS shown in FIG. 8, is configured to generate signals indicative of dynamic virtual lane markers 220 based on speed information from a speed or location schedule 314 or a feedback signal from a laboratory instrument, e.g. a dynamometer 12, rolls, or other instrument, and display the virtual lane markers 220 on a transparent or semi-transparent screen or monitor 210, within view of the at least one camera 300, and at screen or monitor 210 coordinates reflective of relative locations of the at least one camera 300 and the screen or monitor 210. Furthermore, the generated signals are indicative of modified virtual lane markers 220 by masking portions of the virtual lane line markers 220 wherever the screen or monitor 210 locations or coordinates of the virtual lane markers 220 and the screen or monitor 210 locations or coordinates of the VLSCTA 2 physical objects or target bodies, or similar apparatus, coincide or conflict. The locations of the physical objects or target bodies 8, 8', 218 are known from the speed or location schedule 314 when operating in an open-loop manner, or optionally, they are continuously output from the VLSCTA 2 and input to the electronic simulator through an electronic input channel to serve as feedback for masking of the virtual lane markers 220 where appropriate. The speed or location schedule 314, or feedback signal from the laboratory instrument or dynamometer 12 or rolls allows this process to be conducted dynamically, i.e. provides for dynamic or moving, masked lane markers 220 for detection by the at least one camera 300, simultaneously with camera 300 detection of objects or simulated objects, or physical bodies 8, 8', 218 through the transparent or semi-transparent monitor or screen 210, but located and moving behind the monitor or screen 210, and relative to the vehicle 6.

Figure 9:
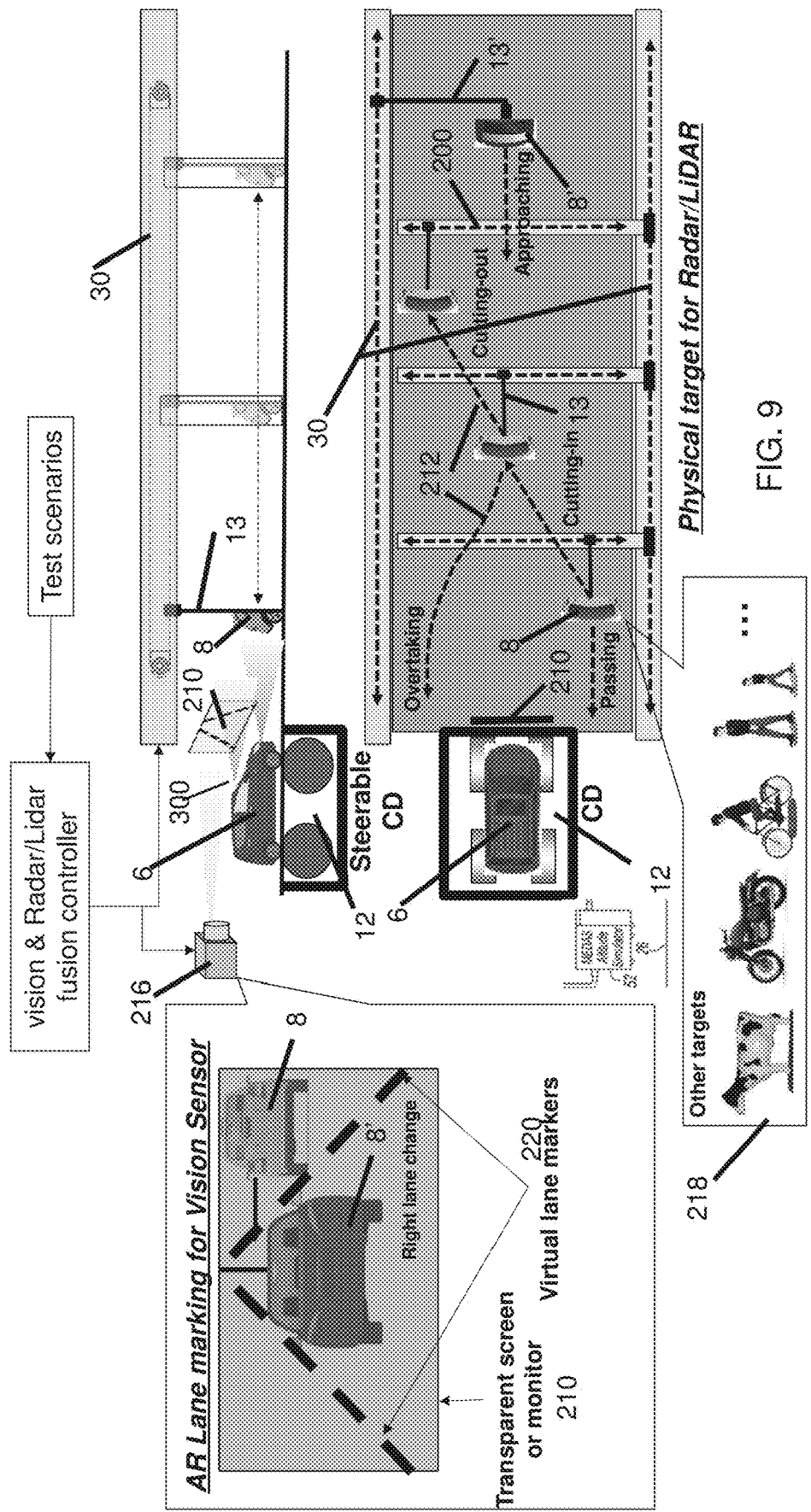
FIG. 9 shows a method for testing a camera-based autonomous or semi-autonomous vehicle or system in a laboratory that employs dynamic physical objects or targets that are viewed by the camera through a screen or monitor in which coordinated and dynamic virtual lane markers are displayed on the screen or monitor and simultaneously viewed by the camera.

The laboratory apparatus can be a steerable dynamometer 12 that provides a load to the vehicle powertrain, or a set of wheel rolls (not shown), either of which allows the vehicle 6 wheels to turn at a rate controlled by the vehicle 6 itself during a simulated drive. Alternatively, the sensors comprising an autonomous vehicle control system (e.g. radar, LiDAR, cameras) can be mounted onto a stationary structure or jig (not shown) at the desired locations for each sensor, e.g. for the purpose of testing a new autonomous system prior to the availability of a complete vehicle having the autonomous system installed. A transparent or semi-transparent monitor 210 is located between the camera 300 and the VLSCTA 2, or similar apparatus as shown in FIG. 9. The transparency of the screen or monitor 210 allows the camera 300 to view or detect all of the real objects, e.g. the physical bodies 8, 8', 218, located behind the screen or monitor 210, simultaneously with the projected, in the case of a screen, or with the displayed, in the case of a monitor, virtual lane markers 220. Furthermore, when the processor 360 (FIG. 8) is supplied with object or target location data of physical bodies or objects behind the screen or monitor that are determined to coincide with screen or monitor display 210 coordinates or locations of virtual lane markers 220, the virtual lane marker 220 data is modified to mask the virtual lane markers 220 in those display or monitor 210 locations. In this way, the physical bodies or objects, e.g. the physical targets 8, 8', 218 located behind the display or monitor 210 are viewed properly by the camera 300, by the prevention of virtual lane markers 220 being viewed by the camera 300 on top of, or overlapping with, the real physical bodies. The virtual lane markers 220 can be thought of as a "back layer" with respect to the physical bodies to allow the physical bodies to at least temporarily appear to cover, or block the view of the virtual lane markers 220, e.g. during lane change or passing maneuvers, or whenever a physical target body 8, 8', 218 would be crossing over a real lane marker for a roadway or scenario that is being simulated. Using the vehicle speed data feedback 370 (FIG. 8) from a related laboratory dynamometer 12, rolls (not shown), or other instrument, the processor 360 continuously updates the masked lane marker 220 data output to the semi-transparent screen or monitor 210, thereby providing dynamic lane markers 220 that reflect the simulated motion of the vehicle 6 or autonomous control system, even during simulated steering maneuvers, the shape and extent of the simulated three dimensional roadway, as well as the motion of the simulated objects or physical bodies behind the screen or monitor in three dimensions. The net effect is a view to the camera 300 of real physical targets or bodies located behind the screen or monitor and moving dynamically along a simulated roadway represented by virtual lane markers 220 displayed on the screen or monitor, all in accordance with a chosen testing scenario.

The vehicle 6 can also be tested under arbitrary traffic scenarios or evasive driving actions comprising vehicle 6 steering maneuvers executed by a human driver inside, or remotely stationed outside of the vehicle 6, a robot driver (not shown), or the vehicle 6 autonomous vehicle control system itself, e.g. during emergency braking lane changes or executing "lane keep assist" functions to aid the driving. Such steering maneuvers would result in a change to the relative positions of, or the geometric relationship of the vehicle 6, to the virtual lane markers 220, as detected by the vehicle camera 300, compared with the relative positions or geometric relationship in the absence of a steering maneuver. For example, a lateral lane-changing maneuver by the vehicle 6 would be associated with a relative, corresponding movement of any physical target bodies 8, 8', 218 and virtual lane markers 220, shifted proportionately in the opposite lateral direction, based on a steering signal 380 from the vehicle 6 or dynamometer 12 or rolls (not shown) steering mechanism (not shown). At all times, and for any maneuver conducted by the vehicle 6, or for any motion of the physical target bodies 8, 8', 218, the resultant view of the physical target bodies' 8, 8', 218 relative positions to the vehicle 6, and the view of the virtual lane markers 220 presented to a camera 300 of the autonomous vehicle 6 during testing, accurately represent the view or perspective the same vehicle camera 300 would have of real vehicles or objects, if it conducted the same maneuver, or executed the same test scenario, in the real-world in the presence of similar real objects or targets.

The example embodiment of a testing method shown in FIG. 9 provides the projection or display of virtual lane markers 220 for viewing by a camera 300 of the vehicle 6 being tested, and properly coordinated in space and synchronized in time with any other vehicle sensor inputs related to automated vehicle control, including those associated with any camera, radar and LiDAR systems.

The projector 216 projects a dynamic image of the lane markers 220 associated with the vehicle maneuvers onto a transparent or nearly-transparent screen 210, thereby creating the virtual lane markers 220 for a traffic or driving scenario for testing the vehicle on the steering-enabled dynamometer 12 or rolls. Alternatively, virtual lane markers 220 can be displayed on the transparent, or nearly transparent video monitor properly placed with respect to the camera. As described above, the vehicle camera simultaneously "sees" these virtual lane markers 220 fused with its unobstructed view of the real physical target bodies 8, 8' 218 through the transparent screen or transparent display monitor 210 while the vehicle 6 also simultaneously receives additional inputs from its radar and LiDAR sensors due to the presence of the same physical target bodies 8, 8', 218. The result is that each sensor associated with the autonomous vehicle control system receives appropriate signals that are indistinguishable from the inputs that would be experienced from driving the vehicle 6 in the real world under the same traffic scenario. The vehicle autonomous control system is then able to fuse the various inputs together as it is programmed to do. The vehicle 6 can be tested under arbitrary traffic scenarios comprised of various vehicle maneuvers simulated by the target bodies 8, 8', 218 and steering maneuvers of the vehicle 6 itself, as described above. Additional target bodies with lateral, longitudinal, and even vertical control can also be used.

Maneuvers requiring lane changes, e.g., passing maneuvers or merging maneuvers, can be implemented using the two dimensional motion of the speed or position controlled real physical target bodies 8, 8', 218 coordinated with generation and projection or display of the corresponding virtual lane markers 220. In this embodiment, any of the physical target bodies 8, 8', 218 can be physically moved forward and backward, as well as side to side, relative to the vehicle being tested.

It should be noted that these maneuvers include non-vehicle physical targets as well, e.g., the simulation of a pedestrian crossing a street in front of the test vehicle. This could be accomplished by diagonal real motion of a physical pedestrian target (shown as part of the set of targets 218) in front of the vehicle 6, thereby accounting for not only the horizontal motion of the pedestrian, but also the forward motion of the vehicle 6. Speeds of the test vehicle 6 on the dynamometer 12 or rolls will be limited by the speed constraints of the physical targets used.

Figure 10:
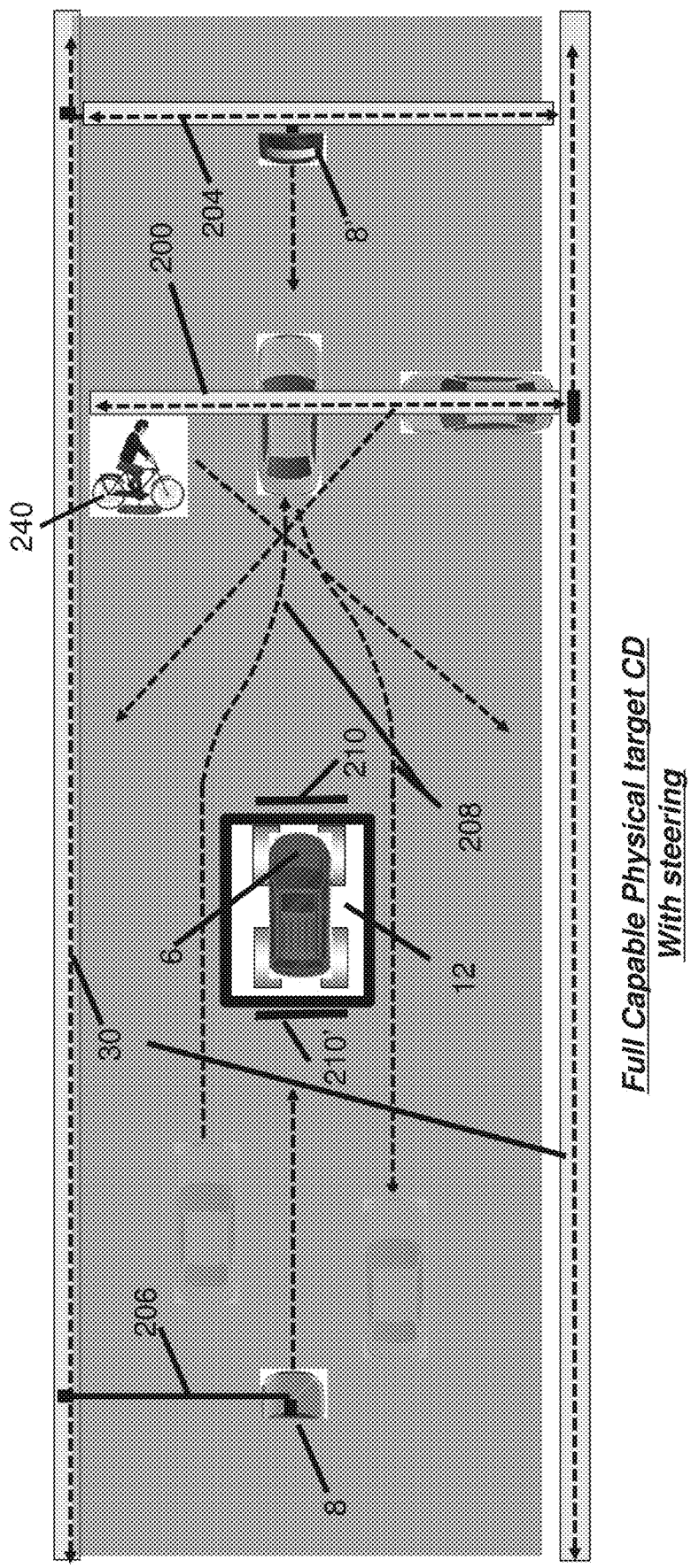
FIG. 10 shows a general method for testing a camera-based autonomous or semi-autonomous vehicle or system in a laboratory that employs dynamic physical objects or targets that are viewed by the camera through a screen or monitor in which coordinated and dynamic virtual lane markers are displayed on the screen or monitor and simultaneously viewed by the camera, for which there are dynamic physical objects or targets surrounding the autonomous vehicle or system.

FIG. 10 shows an embodiment of the invention in which the physical target body 8, 8', 218 range of motion includes motion behind the test vehicle 6 on the dynamometer 12 or rolls. This allows additional maneuvers, e.g., passing maneuvers to be tested. If the vehicle autonomous control system employs a rear-facing camera, a rear projection screen 210' or transparent monitor would also be necessary for displaying virtual lane markers on it. Use of a dynamometer with steering capability 12, or rolls with steering capability, allows the autonomously controlled vehicle to also react laterally.

An example scenario shown in FIG. 10 is that of a simulated cyclist 240 crossing the road, or alternatively a cyclist swerving in front of the test vehicle 6 while moving in the same direction as the vehicle 6. Both of these example maneuvers require the ability to coordinatingly move the physical target bodies 8, 8', 240 in at least two dimensions, i.e., both longitudinally and laterally with respect to the test vehicle 6 while also coordinated with the virtual lane markers 220. These motions are necessary whenever the vehicle 6 performs evasive steering maneuvers. It should be understood that a vehicle 6 does not need to be complete, and even a stationary testing fixture, even one without wheels, can be used in place of a complete vehicle, for mounting the various autonomous or semi-autonomous sensors (e.g. radar sensors, LIDAR sensors, and cameras) in desired relative locations to each other, and to the transparent or semi-transparent screen or monitor 210, 210'. This testing approach is particularly advantageous for developing autonomous or semi-autonomous systems prior to the availability of a complete vehicle, for adapting an autonomous or semi-autonomous system from use in one vehicle model to another vehicle model, or for easily substituting autonomous or semi-autonomous components or sensors in-the-loop (e.g. evaluating the effect of swapping a radar, LIDAR, or camera model, with a newer or different model).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A testing method for a camera-based autonomous or semi-autonomous vehicle control system, the testing method comprising:

while the vehicle control system operates with at least one control input from at least one camera during a first laboratory test of the vehicle control system, automatically controlling an electronic simulator configured to generate signals indicative of dynamic virtual lane markers based on speed information from a speed schedule or a feedback signal from a laboratory instrument, and displaying the virtual lane markers on a transparent or semi-transparent screen or monitor, within view of the at least one camera, and at screen or monitor coordinates reflective of relative locations of the at least one camera and the screen or monitor.

2. The testing method of claim 1, wherein the generated signals are indicative of modified virtual lane markers that are masked on the transparent or semi-transparent screen or monitor wherever the screen or monitor coordinates of the virtual lane markers and screen or monitor coordinates of location information coincide.

3. The testing method of claim 1 further comprising detecting by the at least one camera objects or simulated objects visible through and behind the screen or monitor moving relative to the vehicle.

4. A testing method for a vehicle with a camera-based autonomous or semi-autonomous vehicle control system, the testing method comprising:
while the vehicle operates with at least one control input from at least one camera during a first laboratory test of the vehicle, automatically controlling an electronic simulator configured to generate signals indicative of dynamic virtual lane markers based on speed information from the vehicle, or a feedback signal from a laboratory instrument, and displaying the virtual lane markers on a transparent or semi-transparent screen or monitor, within view of the at least one camera, and at screen or monitor coordinates reflective of relative locations of the at least one camera and the screen or monitor.

5. The testing method of claim 4, wherein the generated signals are indicative of modified virtual lane markers that are masked on the screen or monitor wherever the screen or monitor coordinates of the virtual lane markers and screen or monitor coordinates of location information coincide.

6. The testing method of claim 4 further comprising detecting by the at least one camera objects or simulated objects visible through and behind the screen or monitor moving relative to the vehicle.

7. A testing method comprising:
while a dynamometer assembly applies a load to, or a roller assembly allows simulated motion of, an autonomous or semi-autonomous vehicle during a first laboratory test of the vehicle, automatically controlling, according to speed parameter feedback from the dynamometer assembly, the roller assembly, or the vehicle, an electronic simulator configured to project on a transparent or semi-transparent screen or monitor virtual lane markers moving relative to the vehicle; and
detecting by a camera the virtual lane markers, and objects or simulated objects visible through and behind the screen or monitor moving relative to the vehicle.

8. The testing method of claim 7, wherein the virtual lane markers are selectively masked according to screen or monitor coincident coordinate data, further comprising detecting by the camera the masked virtual lane markers, and objects or simulated objects visible through and behind the screen moving relative to the vehicle.

9. A road lane marker generation and virtual display system for testing a camera-based autonomous or semi-autonomous vehicle or vehicle control system comprising:
data input channels for electronically receiving test configuration data, roadway design data, simulated or real object location data, and simulated vehicle speed data;
a processor for generating virtual lane marker data;
a data output channel for electronically outputting virtual lane marker data; and
a transparent or semi-transparent display screen or monitor for displaying virtual lane markers, wherein the test configuration data defines a geometric relationship between the camera, the display screen or monitor, and a spatial orientation of the screen or monitor, wherein the simulated or real object location data defines locations of objects visible through the display screen or monitor, wherein the roadway design data defines a size and locations of the simulated lane markers, wherein the processor receives data from the data input channels and outputs the virtual lane marker data to the transparent or semi-transparent display screen or monitor via the data output channel, and the transparent or semi-transparent display screen or monitor displays the virtual lane markers.

* * * * *